: US 7,567,943 B2
(45) Date of Patent: Jul. 28, 2009

(12) United States Patent
Nash et al.

(54) SYSTEM AND METHOD FOR COMPOSITION OF MAPPINGS GIVEN BY DEPENDENCIES

(75) Inventors: Alan P Nash, La Jolla, CA (US); Philip A Bernstein, Bellevue, WA (US); Sergey Melnik, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/014,940

(22) Filed: Dec. 17, 2004

(65) Prior Publication Data

US 2006/0136463 A1 Jun. 22, 2006

(51) Int. Cl.
*G06N 5/00* (2006.01)
(52) U.S. Cl. .......................... 706/17; 706/45
(58) Field of Classification Search ................. 706/17, 706/45
See application file for complete search history.

(56) References Cited

U.S. PATENT DOCUMENTS 6,785,673 B1 * 8/2004 Fernandez et al. ............ 707/3

OTHER PUBLICATIONS

Fagin et al. "Composing Schema Mappings: Second-Order Dependencies to the Rescue". Jun. 14-16, 2004. ACM, PODS 2004.*

Miller. "Unification Under a Mixed Prefix". 1992, Academic Press Limited. J. Symbolic Computation (1992).*
Peters et al. "Axiomatization of Dynamic Schema Evolution in Objectbases". 1995, IEEE. 11th Int'l Conf. on Data Engineering. pp. 1-9.*
R. Fagin, et al., Composing Schema Mappings: Second-Order Dependencies to the Rescue, Jun. 14-16, 2004, 13 pages, PODS 2004, Paris, France.
J. Madhavan, et al., Composing Mappings Among Data Sources, 2003, 12 pages, Proceedings of the 29th VLDB Conference, Berlin, Germany.
P. A. Bernstein, Applying Model Management to Classical Meta Data Problems, Proceedings of the 2003 CIDR Conference, 12 pages.
Basics: Relational Query Languages.

* cited by examiner

*Primary Examiner*—Wilbert L Starks, Jr.
(74) *Attorney, Agent, or Firm*—Lee & Hayes, PLLC

(57) ABSTRACT

A system that facilitates composition of schema mappings. A general algorithm is provided for composing a broad class of mappings, where one or both mappings are not functions, such as constraints between two schemas and the inverse of functions. A composition component performs composition on schema mappings of disparate data sources, which schema mappings can be expressed by at least one of full, embedded, and second-order dependencies, wherein the second-order dependencies need not be in source-to-target form. The algorithm for composition further includes a procedure that tests whether the composition algorithm will terminate.

13 Claims, 9 Drawing Sheets

SYSTEM AND METHOD FOR COMPOSITION OF MAPPINGS GIVEN BY DEPENDENCIES

TECHNICAL FIELD

This invention is related to systems and methods of constructing a mapping between database schemas, which mapping is composed from existing mappings.

BACKGROUND OF THE INVENTION

The advent of global communications networks such as the Internet has facilitated access to enormous amounts of data. The world is populated with information sources where in many cases the data is represented differently from source to source. The free flow of information prevalent today in wired and wireless regimes demands that the source and destination be compatible insofar as storing and interpreting the data for use. A major problem facing companies and individuals today is that the data existing in one model/schema needs to be accessed via a different model/schema. However, such processes are being hampered by a largely disparate and ever-changing set of models/schemas. Such an example can be found in data warehousing where data is received from many different sources for storage and quick access from other sources. Converting data from one model to another model is not only time-consuming and resource intensive, but can be fraught with conversion problems.

Schema mappings specify the relationships between heterogeneous database sources and are used to support data transformation, data exchange, schema evolution, constraint checking, and other tasks. Mapping composition is an operation that takes as input two mappings $map_{AB}$ and $map_{BC}$ between schemas A, B, C and produces a single mapping $map_{AC}$ that specifies the same set of constraints between A and C that is given by the combined mappings $map_{AB}$ and $map_{BC}$.

To illustrate the use of mapping composition, consider the following schema evolution scenario. Assume that $S_1$, $S_2$, $S_3$, $S_4$ are versions of a schema used in successive releases of a product. The mapping $map_{12}$ is used to migrate data from schema $S_1$'s format to schema $S_2$'s format. Similarly, mapping $map_{23}$ is used to migrate data from schema $S_2$'s format to schema $S_3$'s format, and finally, $map_{34}$ is used to migrate data from schema $S_3$'s format to schema $S_4$'s format. A conventional way of migrating the data from version $S_1$ to version $S_4$ is by executing $map_{12}$, $map_{23}$, $map_{34}$ one by one, which is time-consuming and costly. To migrate the data from $S_1$ to $S_4$ in a single step, mapping composition is required. The mapping $map_{14}$ can be obtained by first composing $map_{12}$ and $map_{23}$, and then composing the resulting mapping with $map_{34}$.

Now suppose $V_1$ is a view defined on $S_1$ and $map_{1V1}$ is a function. To migrate view $V_1$ from $S_1$ to $S_2$, composition is again used. The inverse of mapping $map_{12}$ is composed with $map_{1V1}$ to obtain a mapping $map_{2V1}$ from $S_2$ to $V_1$.

Algorithms for mapping composition are well-known for the case where each mapping is a function (i.e., maps one database state to exactly one database state, and both mappings have the same directionality). However, there is a substantial unmet need for an algorithm which is suitable for a broader class of mappings where one or both mappings are not functions.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention is a general algorithm that is suitable for composing a broader class of mappings, where one or both mappings are not functions, such as constraints between two schemas and the inverse of functions. This enables construction of a mapping between database schemas from two existing mappings by composing them. The algorithm for composition includes a procedure that tests whether the composition algorithm will terminate.

The invention disclosed and claimed herein, in one aspect thereof, comprises a system that facilitates composition of schema mappings. A composition component performs composition on existing schema mappings of disparate data sources, which schema mappings can be expressed by at least one of full, embedded, and second-order dependencies, wherein the second-order dependencies need not be in source-to-target form.

In another aspect of the subject invention, a methodology is provided for composing two schema mappings by Skolemizing the schema mappings expressed by the embedded dependencies to obtain schema mappings expressed by the second-order dependencies; computing a finite axiomatization of all constraints over input and output signatures which can be deduced from the constraints that give the schema mappings; and de-Skolemizing a finite axiomatization to obtain a schema mapping expressed by an embedded dependency.

In still another aspect thereof, a methodology is provided where the act of de-Skolemizing the finite axiomatization further comprises unnesting Skolem functions using equality to generate a conclusion; checking that all variables in the conclusion appear in a variable dependency set of the Skolem functions; generating all possible clauses that can be obtained by unifying Skolem functions that appear in the conclusion; and de-Skolemizing each clause separately by substituting each Skolem term by a new existential variable.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
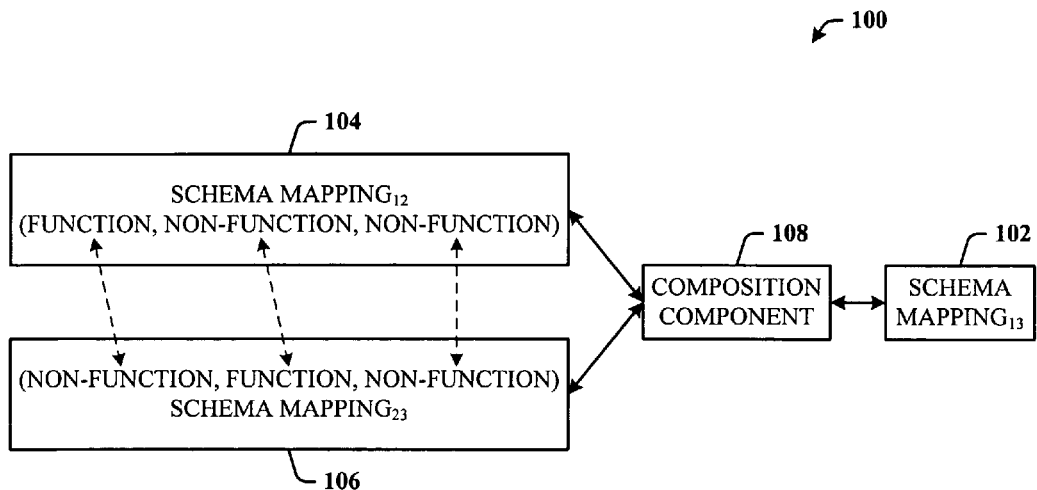
FIG. 1 illustrates a diagram that represents construction of a resulting mapping by composition of two existing mappings between database schemas in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Composition of Mappings

The subject invention is a general algorithm that is suitable for composing a broader class of mappings, where one or both mappings are not functions, such as constraints between two schemas (such as $map_{12}$, $map_{23}$, and $map_{34}$) and the inverse of functions (such as the inverse of $map_{12}$).

FIG. 1 illustrates a diagram 100 that represents construction of a resulting mapping 102 by composition of two existing mappings (104 and 106) between database schemas (not shown) in accordance with the subject invention. A first schema mapping 104 (denoted SCHEMA $MAPPING_{12}$) is provided and which can be a function or a non-function. Similarly, a second schema mapping 106 (denoted SCHEMA $MAPPING_{23}$) is provided and can be a function or a non-function. Algorithms for mapping composition are well-known for the case where each mapping is a function. Thus, the invention addresses instances only where one or both of the mapping schemas (104 and 106) is a non-function.

As illustrated by the dashed lines, the following scenarios are addressed: when the first schema mapping 104 is a function, the second schema mapping 106 is a non-function; when the first schema mapping 104 is a non-function, the second schema mapping 106 is a function; and, when the first schema mapping 104 is a non-function, the second schema mapping 106 is a non-function. The schema mappings (104 and 106) are composed using a composition algorithm component 108 to generate the resulting mapping 102 (denoted SCHEMA $MAPPING_{13}$). The composition component 108 employs a deductive procedure to obtain a finite axiomatization of all constraints that need to appear in the composition mapping. This is described in detail infra.

Figure 2:
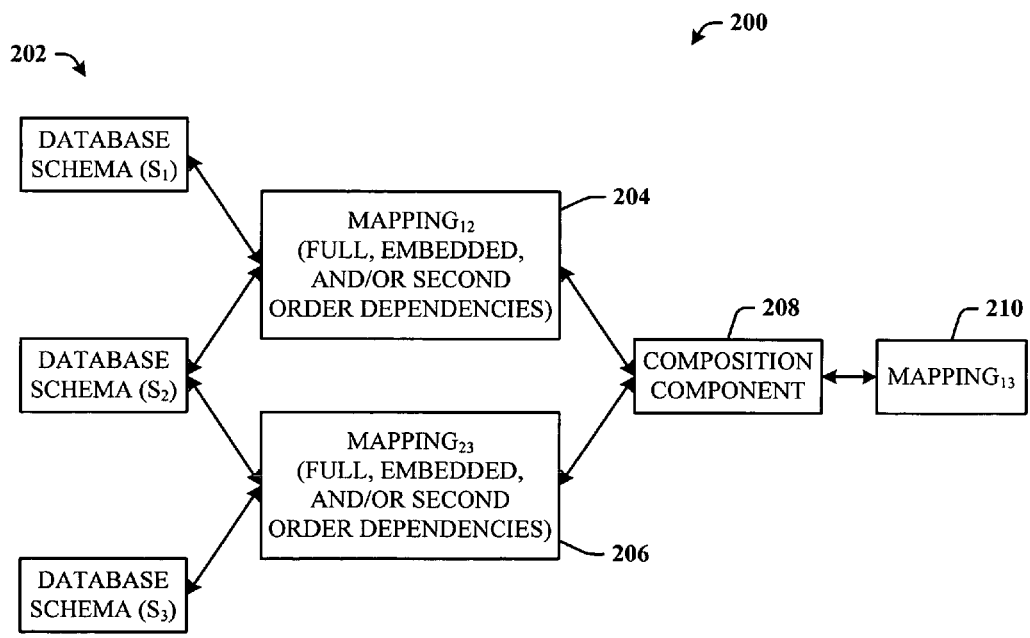
FIG. 2 illustrates a diagram that represents mapping composition of logical constraints in accordance with the invention.

In any of the three non-function mappings, the mappings can be represented by logical constraints, or clauses. FIG. 2 illustrates a diagram 200 that represents mapping composition of logical constraints in accordance with the invention. There are provided three data base schemas 202 (denoted $S_1$, $S_2$, and $S_3$) from which first and second schema mappings (204 and 206) (denoted respectively as $MAPPING_{12}$ and $MAPPING_{23}$) are derived.

A compose component 208 (similar to component 108) facilitates composition of the two schema mappings (204 and 206) into a resulting schema mapping 210 (denoted $MAPPING_{13}$). The considered constraint languages include full dependencies ($CQ_0^=$ mappings), embedded dependencies ($CQ^=$ mappings), or second-order dependencies ($SOCQ^=$ mappings, also called second-order tuple-generating dependencies). Thus, each of the first and second mappings (204 and 206) can include constraints which are full, embedded and/or second-order dependencies. Given two finite $CQ_0^=$, $CQ^=$, or $SOCQ^=$ mappings $map_{12}$ and $map_{23}$ that are not necessarily functional, the challenge is to find a $CQ_0^=$, $CQ^=$, or $SOCQ^=$ mapping that specifies the resulting mapping 210 of the composition of $map_{12}$ and $map_{23}$.

Figure 3:
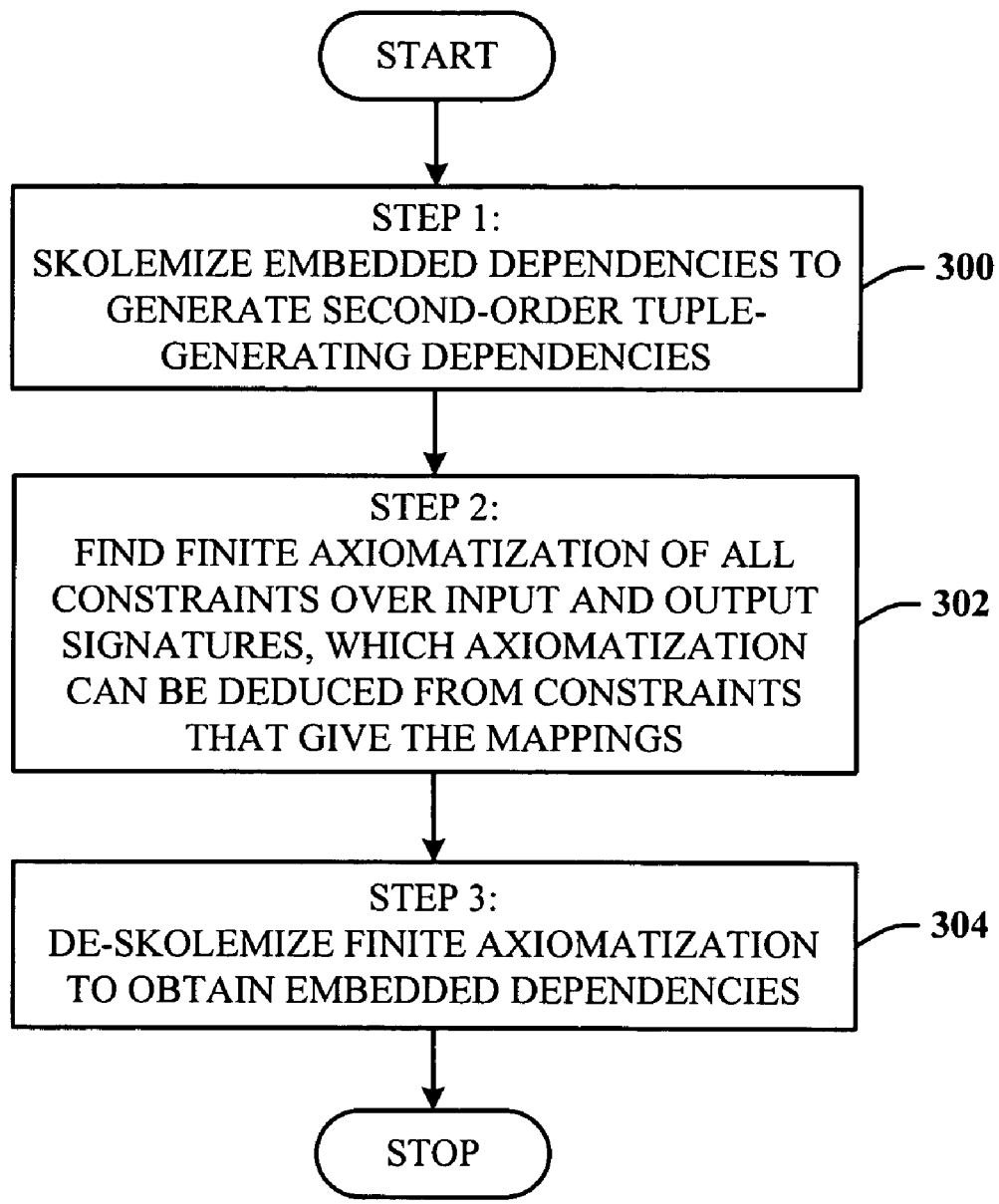
FIG. 3 illustrates a methodology of composition of dependencies in accordance with the invention.

Referring now to FIG. 3, there is illustrated a methodology of composition of dependencies in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

The composition is computed in three steps: the $CQ^=$ mappings are Skolemized to get the second-order dependencies ($SOCQ^=$) mappings. Skolemization is a way to remove existential quantifiers from a formula. Next, a finite axiomatization of all constraints over the input and output signatures is found that can be deduced from the constraints that give the mappings. Finally, the finite axiomatization is de-Skolemized to get a $CQ^=$ mapping. Accordingly there is provided a methodology, such that, at 300, the embedded dependencies are Skolemized to obtain the second-order dependencies. At 302, a finite axiomatization of all constraints over input and output signatures is found. The axiomatizations can be deduced from constraints that give the mappings. At 304, the finite axiomatization is de-Skolemized to obtain the embedded dependencies.

Figure 4:
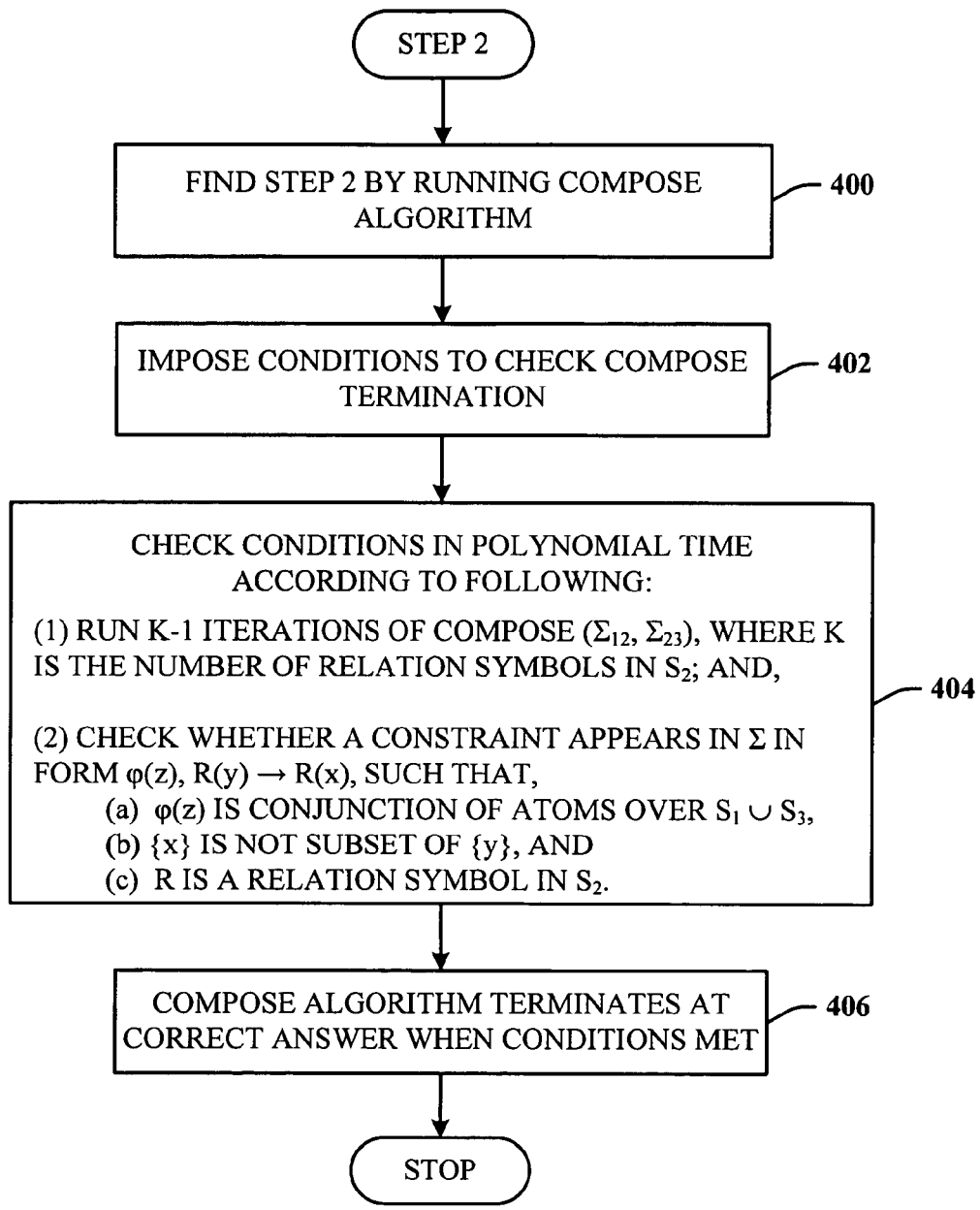
FIG. 4 illustrates a composition methodology in accordance with the invention that imposes conditions and employs checks to determine if composition terminates to a correct answer.

In the case of $CQ_0^=$ mappings and $SOCQ^=$ mappings, only act 302 of FIG. 3 applies. Accordingly, FIG. 4 illustrates a composition methodology in accordance with the invention that imposes conditions and employs checks to determine if composition terminates to a correct answer. At 400, the compose algorithm is run. The following algorithm compose assumes that the input mapping $map_{12}$ is specified by finite sets of $CQ_0^=$ dependencies $\Sigma_{12}$ between schemas $S_1$ and $S_2$, the input mapping $map_{23}$ is specified by $\Sigma_{23}$ between $S_2$ and $S_3$, and the output mapping $map_{13}$ is given by $\Sigma_{13}$ between $S_1$ and $S_3$. (Generalization of this basic algorithm for $CQ^=$ and $SOCQ^=$ mappings is presented infra.)

Algorithm compose $(\Sigma_{12}, \Sigma_{23})$:

---
Set $\Sigma := \Sigma_{12} \cup \Sigma_{23}$
Repeat
    Set $\Sigma' := \emptyset$
    For every pair of clauses $\phi, \psi$ in $\Sigma$
        If there exists a $\sigma_2$-resolvent $\chi_i$ of $\phi, \psi$
            and there is no variant of $\chi_i$ in $\Sigma$
        then set $\Sigma' := \Sigma' \cup \{\chi_i\}$
    Set $\Sigma := \Sigma \cup \Sigma'$
Until $\Sigma' = \emptyset$
Return $\Sigma_{13} :=$ constraints in $\Sigma$ that refer only to symbols of $S_1, S_3$

---

When compose terminates, it is proven that the algorithm gives the correct answer. However, compose may not terminate. At 402, conditions are imposed to check termination of the algorithm. The following conditions can be included to test the sufficiency for algorithm compose to terminate. These conditions can be checked in polynomial time, as indicated at 404, by running k−1 iterations of compose$(\Sigma_{12}, \Sigma_{23})$, where k is the number of relation symbols in $S_2$ and then checking whether a constraint of the form $\phi(z), R(y) \rightarrow R(x)$ appears in $\Sigma$, such that, (1) $\phi(z)$ is a conjunction of atoms over $S_1 \cup S_3$;
(2) $\{x\}$ is not a subset of $\{y\}$; and
(3) R is a relation symbol in $S_2$.

At 406, once the conditions are satisfied, the compose algorithm terminates with the correct answer.

Figure 5:
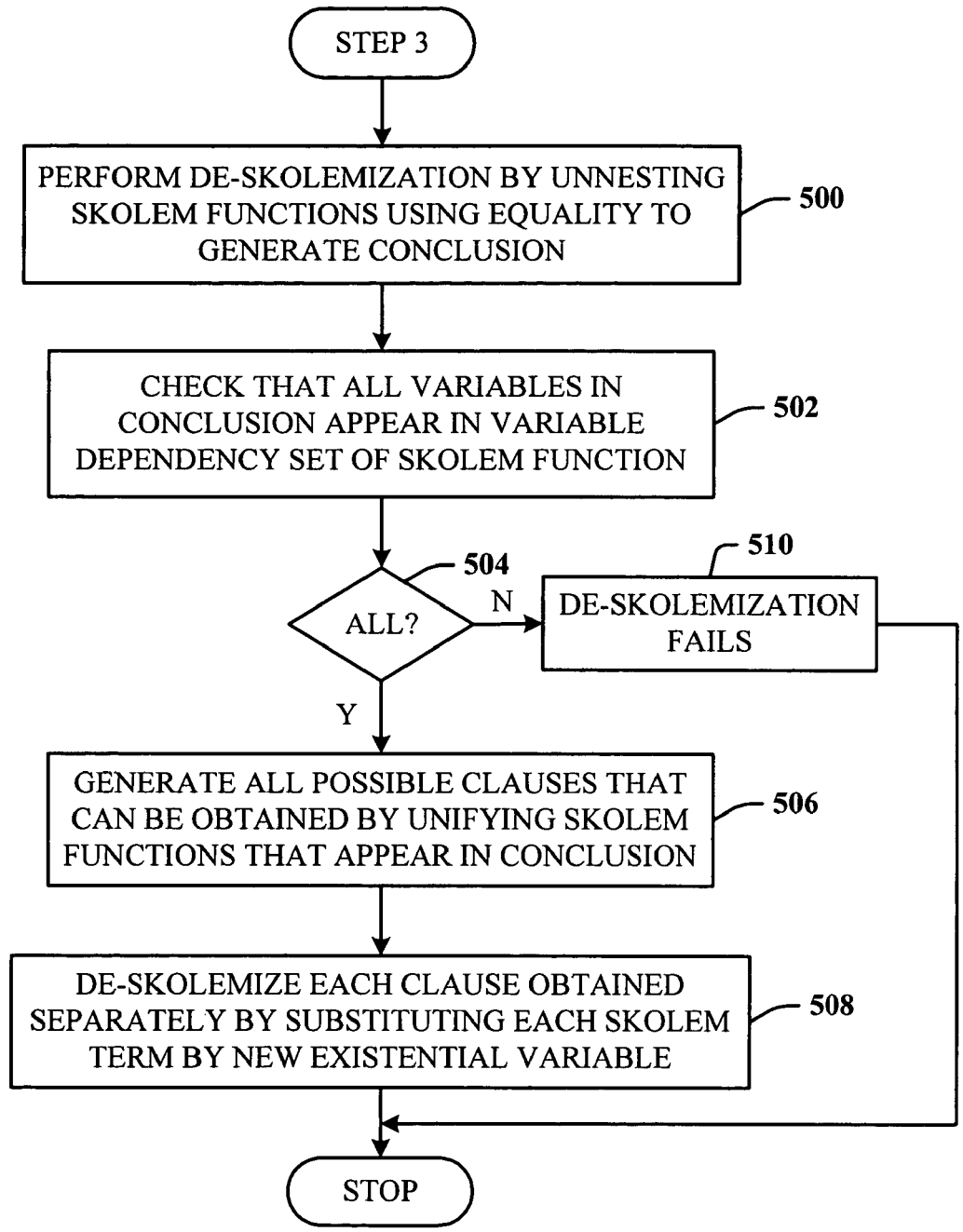
FIG. 5 illustrates a methodology of performing de-Skolemization on a finite axiomatization to obtain an embedded dependency in accordance with the invention.

In order to obtain the embedded dependency, as indicated by act 304 (Step 3) of FIG. 3, an algorithm is provided that gives the correct results. Accordingly, FIG. 5 illustrates a methodology of performing de-Skolemization on a finite axiomatization to obtain an embedded dependency in accordance with the invention. At 500, Skolem functions are unnested using equality to reach a conclusion. At 502, a check is made to ensure that all variables in the conclusion appear in the variable dependency set of each Skolem function. At 504, if all variables in the conclusion appear in the variable dependency, flow is to 506, generate all possible clauses that can be obtained by unifying Skolem functions that appear in the conclusion. At 508, each clause is de-Skolemized separately by substituting each Skolem term with a new existential variable. However, at 504, if all variables do not appear, flow is to 510, where Skolemization fails, and progress ends.

Figure 6:
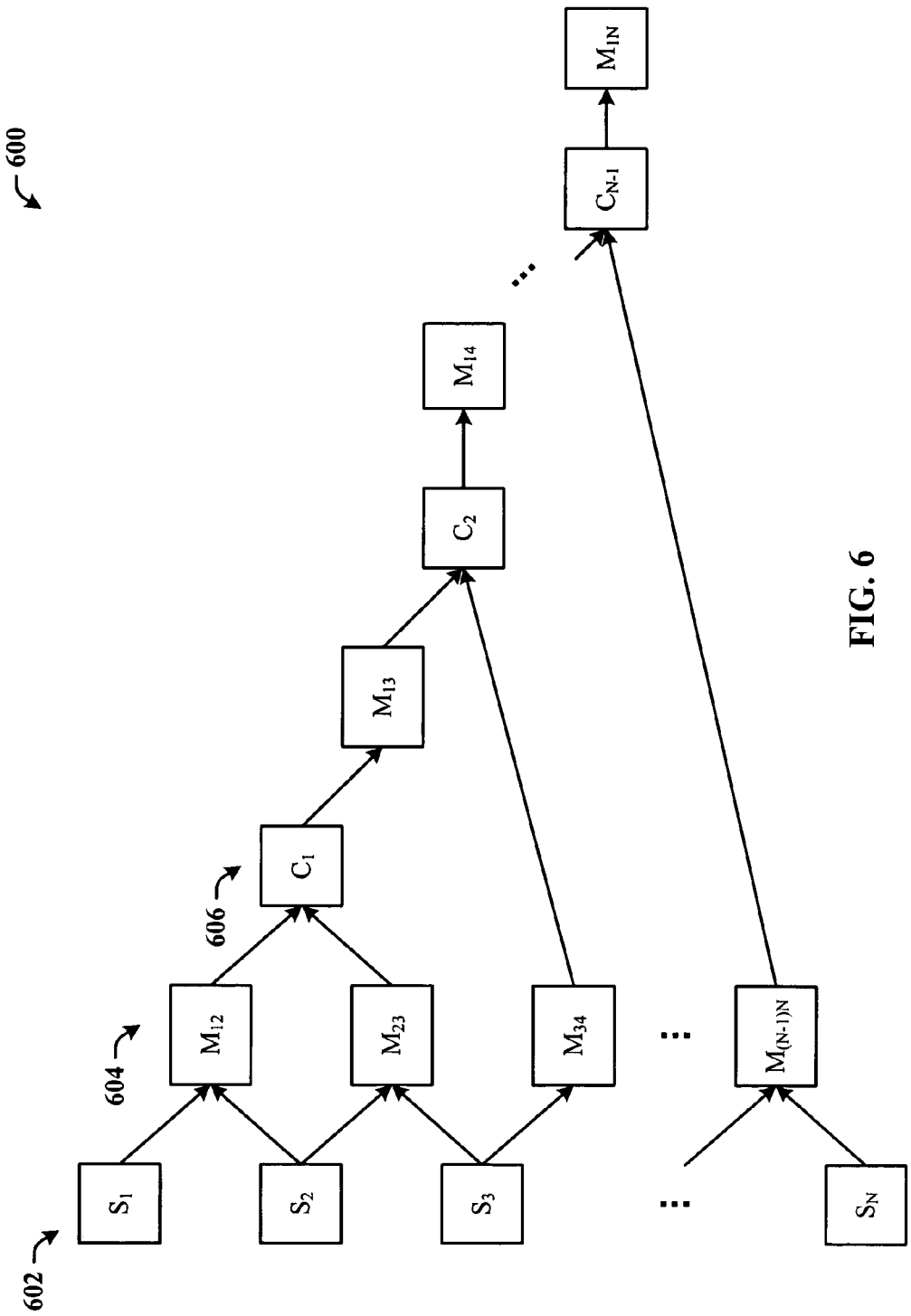
FIG. 6 illustrates a diagram of multiple compositions on more than three data source schemas in accordance with the invention.

FIG. 6 illustrates a diagram 600 of multiple compositions on more than three data source schemas 602 in accordance with the invention. Each pair of data source schemas 602 (denoted $S_1, S_2, S_3, \ldots, S_N$) is associated with a first-order schema mapping 604 (denoted $M_{12}, M_{23}, \ldots M_{(N-1)(N)}$). Each pair of first-order schema mappings 604 is further composed by a composition component (denoted $C_N$). That is, the first pair of first-order schema mappings ($M_{12}$ and $M_{23}$) is composed using a first composition component 606 (denoted $C_1$) to generate a resulting second-order schema mapping $M_{13}$. The resulting second-order mapping $M_{13}$ is then composed with the next first-order schema mapping $M_{34}$ using a different composition component $C_2$ (or the same composition component $C_1$). The process continues until no more first-order schema mappings 604 are available to be composed, and generating the resulting schema mapping $M_{1N}$ at the output.

Figure 7:
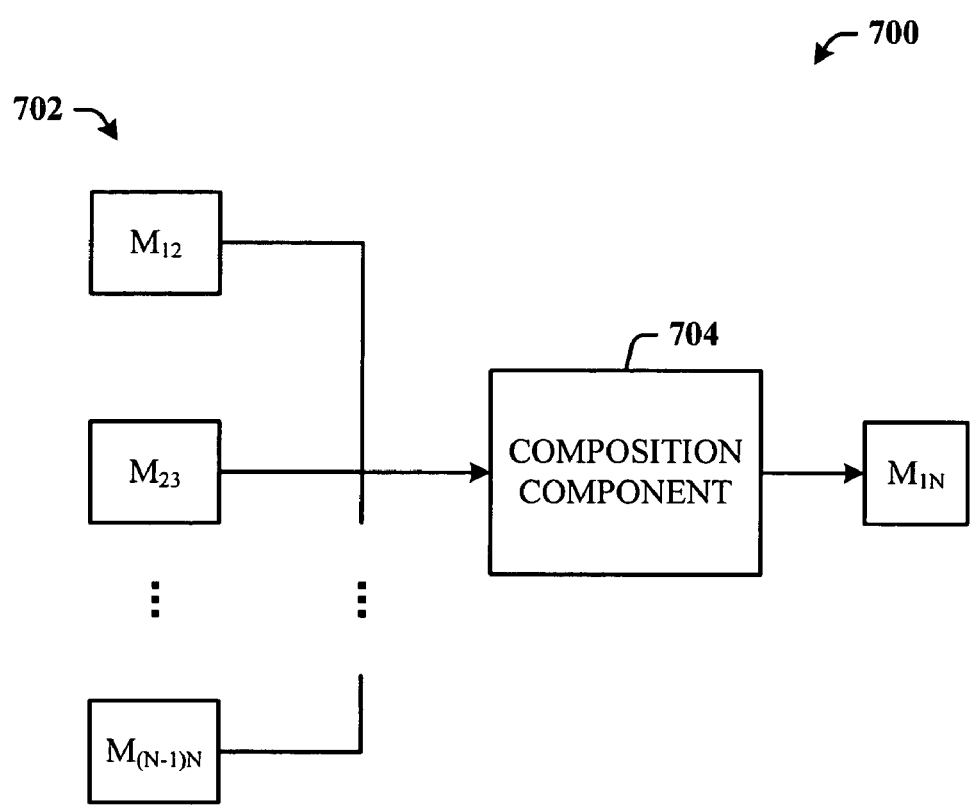
FIG. 7 illustrates composition of multiple mappings that can be performed using a single invocation of the algorithm to obtain the output mapping, in accordance with the invention.

Alternatively, or in addition to the algorithm of FIG. 6, FIG. 7 illustrates a system 700 that facilitates composition of multiple mappings that can be performed using a single invocation of the algorithm to obtain the output mapping $M_{1N}$. Here, a composition component 704 receives multiple inputs of the first-order schema mappings 702 (denoted (denoted $M_{12}, M_{23}, \ldots M_{(N-1)(N)}$), processes the mappings 702, and generates the resulting schema mapping $M_{1N}$ at the output in a single pass.

All algorithms and variations considered infra can be applied to multiple mappings in this fashion. Specifically, the algorithm presented in FIG. 6 can be extended to the algorithm of FIG. 7, and as shown below, can produce a correct composition and terminate even when the stepwise procedure of FIG. 6 fails.

Algorithm compose $(\Sigma_{12}, \Sigma_{23}, \ldots, \Sigma_{(n-1)n})$:

---
Set $\Sigma := \Sigma_{12} \cup \Sigma_{23} \cup \ldots \cup \Sigma_{(n-1)n}$
Repeat
    Set $\Sigma' := \emptyset$
    For every pair of clauses $\phi, \psi$ in $\Sigma$
        If there exists a $\sigma_k$-resolvent $\chi_i$ of $\phi, \psi$ where $2 \leq k < n$
            and there is no variant of $\chi_i$ in $\Sigma$
        then set $\Sigma' := \Sigma' \cup \{\chi_i\}$
    Set $\Sigma := \Sigma \cup \Sigma'$
Until $\Sigma' = \emptyset$
Return $\Sigma_{13} :=$ constraints in $\Sigma$ that refer only to symbols of $S_1, S_n$

---

Analysis of Composition and Non-Functional Mappings

The term "mapping" has become established in the database literature to refer to a binary relation on instances, such as database states or XML documents. A general framework for managing mappings, called model management, studies general operators on mappings and on sets of instances, called models. Among these operators, there are such basic operators as domain, range, composition, inverse, etc.

If a mapping is a function, it is said to be functional. Non-functional mappings appear in many contexts, in particular in data integration and data exchange. There are many natural sources of non-functional mappings. For example, the inverse of a functional mapping which is not injective is a nonfunctional mapping.

Significant interest in the art is found in the development of mappings and models given by constraints, and in particular, mappings given by embedded dependencies and by full dependencies. Such mappings are called $CQ^=$-mappings and $CQ_0^=$-mappings, respectively, because they are given by inclusions of conjunctive queries with equality ($CQ^=$) and inclusions of conjunctive queries with equality, but without existential quantification ($CQ_0^=$). Similarly, models given by embedded dependencies and by full dependencies are called $CQ^=$-models and $CQ_0^=$-models, respectively.

Several fundamental questions are explored for basic operators in the relational setting. Let $\mathcal{L}$ be a language for models and mappings. Given an operator $\mathcal{O}$ and $\mathcal{L}$-models and $\mathcal{L}$-mappings for input: (1) Is the output always an $\mathcal{L}$-model or an $\mathcal{L}$-mapping? (That is, $\mathcal{L}$ is closed under $\mathcal{O}$); (2) If not, is there a decision procedure to determine when the output is an $\mathcal{L}$-model or an $\mathcal{L}$-mapping?; and (3) In case the output is an $\mathcal{L}$-model or an $\mathcal{L}$-mapping, how hard is it to find an expression for the output?

The present description addresses at least the case when $\mathcal{L}$ is $CQ_0^=$, $CQ^=$, or $SOCQ^=$. For many operators (e.g., identity, intersection, and Cartesian product) it can be seen that the answer to (1) is 'yes' and the answer to (3) is 'very easy' (see Proposition 3 infra). For some other operators (e.g., range, domain, and composition) it can be shown that the answers to (1) and (2) are 'no'. Furthermore, large subclasses of $CQ_0^=$, $CQ^=$, and $SOCQ^=$ are introduced for which the answer to (1) is 'yes' and the answer to (3) is 'easy.'

It can be seen that domain, range, and composition are closely related and can be reduced to each other (see Proposition 4 infra). Therefore, it suffices to study composition and inverse. The latter is easy if symmetric restrictions are placed on the languages that define the mappings. On the other hand, composition turns out to be very hard.

Composition of mappings has been studied in the art. In one study, the class of source-to-target second-order tuple-generating dependencies (ST SO tgds) is introduced and shown that the class of mappings given by ST SO tgds is closed under composition. Moreover, several examples are found which illustrate cases where smaller classes of mappings are not closed under composition. In particular, it can be shown that $CQ^=$-mappings are not closed under composition, even when further restricted to source-to-target dependencies.

The subject invention extends work in the prior art in several directions. Herein, mappings given by SO tgds are called $SOCQ^=$-mappings. Notice that Skolemizing $CQ^=$-mappings gives $SOCQ^=$-mappings. Thus, composition of three major classes of mappings is addressed, each properly containing the previous ones:

1. $CQ_0^=$-mappings (full dependencies)
2. $CQ^=$-mappings (embedded dependencies)
3. $SOCQ^=$-mappings (SO tgds)

One case of interest is the case of embedded dependencies ($CQ^=$-mappings). One way to compute composition of such schema mappings, as referenced in FIG. 3 supra, is to (1) Skolemize the $CQ^=$-mappings to get $SOCQ^=$-mappings, (2) find a finite axiomatization of all constraints over the input and output signatures that can be deduced from the constraints that give the mappings, and finally, (3) de-Skolemize the finite axiomatization to get a $CQ^=$-mapping. Difficulties arise from steps 2 and 3.

The subject invention extends the restrictions of languages considered to obtain closure under inverse, which fails in the case of source-to-target constraints, because the inverse of a source-to-target constraint is a target-to-source constraint.

Subclasses of $CQ_0^=$, $CQ^=$ and $SOCQ^=$ are provided which are closed under composition and inverse, and which ideally, include constraints that arise from $CQ_0^=$ and $CQ^=$ queries, which are known to be closed under composition.

It is desired to have widely applicable, polynomial-time-checkable, sufficient conditions for the composition of two $CQ_0^=$-mappings ($CQ^=$, $SOCQ^=$) to be a $CQ_0^=$-mapping ($CQ^=$, $SOCQ^=$). Moreover, it is preferred to know whether there are computable necessary and sufficient conditions or whether the problem is undecidable.

Summarizing some aspects provided herein, it is shown that $CQ_0^=$-mappings are not closed under composition. The problem of determining whether the composition of two $CQ_0^=$ mappings is a $CQ_0^=$-mapping is shown to be undecidable. These results carry over to the case of $CQ^=$-mappings and $SOCQ^=$-mappings. Additionally, several equivalent (non-effective) conditions for composition are provided.

Polynomial-time-checkable sufficient conditions for composition are introduced, which include the case of constraints given by queries. Moreover, subsets of $CQ_0^=$, $CQ^=$, and $SOCQ^=$ are identified which are closed under composition and inverse, and which include the case of constraints given by queries. Finally, a polynomial-time algorithm is presented for computing the composition of $CQ_0^=$, $CQ^=$, and $SOCQ^=$-mappings which satisfy the conditions above.

Preliminary Information

A signature $\sigma = \{R_1, R_2, \ldots, R_N\}$ is a set of relation symbols. A relational atom is a formula of the kind $R(t_1, \ldots, t_m)$, where $t_i$ is a variable or constant. An equality atom is a formula of the kind $t_1 = t_2$, where $t_i$ is a term, such as a variable or a constant. CQ is defined as the set of conjunctive queries, i.e., formulas of the kind $\exists x_1, \ldots \exists x_m (\phi(x_1, \ldots, x_m, y_1, \ldots, y_n))$, where $\phi$ is a conjunction of relational or equality atoms and each of the free variables $y_1, \ldots, y_n$ occurs in some relational atom. $CQ_0$ is the set of queries with conjunction, but no existential quantifiers (i.e., when m=0; also called select-join queries). Given a query class $\mathcal{L}$, $\mathcal{L}^=$ is the corresponding query class that also includes equality.

Skolem(Q) is defined to be the formula obtained from Q by replacing existential quantifiers with Skolem functions; it is an existential second-order formula that asserts the existence of the Skolem functions and which does not have first-order existential quantifiers. For example, if $$Q = \exists y (Exy, Eyz) \rightarrow Exz$$

then $$\text{Skolem}(Q) = \exists f (E(x, f(xz)), E(f(xz), z) \rightarrow Exz).$$

Set $Sk\mathcal{L} := \{\text{Skolem}(Q): Q \in \mathcal{L}\}$. Given a set of constraints $\psi$ over the signature $\sigma_1 \cup \sigma_2$, $\psi|_{\sigma_1}$ is the set of constraints in $\psi$ which only contain relation symbols in $\sigma_1$. A constraint which contains a relation symbol from $\sigma_1$ in the premise or in the conclusion is called a $\sigma_1$-constraint.

Models and mappings. A model is a set of instances. A model can be expressed in a concrete language, such as SQL DDL, XML Schema, etc. For example, a relational schema denotes a set of database states; an XML schema denotes a set of XML documents; a workflow definition denotes a set of workflow instances; a programming interface denotes a set of implementations that conform to the interface. A mapping is a relation on instances. Unless stated otherwise, it is assumed that all mappings are binary, i.e., they hold between two models. A mapping can be expressed in a concrete language, such as SQL DML, XSLT, etc.

Constraints for specifying mappings. A constraint is a Boolean query. Sets of constraints are denoted with capital Greek letters, and individual constraints with lowercase Greek letters. The constraints to be considered are in $$IC(\mathcal{L}) := \{\forall \bar{x} (Q_1(\bar{x}) \rightarrow Q_2(\bar{y})) : Q_1, Q_2 \in \mathcal{L}\}$$

where $\{\bar{x}\}$ is the set of free variables in $Q_1$, $\{\bar{y}\} \subseteq \{\bar{x}\}$, and $\mathcal{L} \in \{CQ_0, CQ_0^=, CQ, CQ^=\}$. These are called query inclusion constraints over $\mathcal{L}$. These kinds of constraints express the containment of $Q_1$ in $Q_2$ and are known as embedded dependencies in the case where $\mathcal{L}$ is $CQ^=$ and as full dependencies in the case where $\mathcal{L}$ is $CQ_0^=$. Also considered are constraints in $$IC(SOCQ^=) := \exists \bar{f} \{\forall \bar{x} (Q_1(\bar{x}) \rightarrow Q_2(\bar{y}))\}$$

where $\{\bar{x}\}$ is the set of free variables in $Q_1$, $\{\bar{y}\} \subseteq \{\bar{x}\}$, and $Q_1, Q_2$ are like $CQ_0^=$ queries, except they may also have terms constructed from the function symbols $\bar{f}$. IC(SOCQ) is defined similarly, with $Q_1, Q_2$ are like $CQ_0$ queries.

Given a query language $\mathcal{L}$, associate to every expression of the form $$(\sigma_1, \sigma_2, \Sigma_{12})$$

where $\Sigma_{12}$ is a finite subset of $IC(\mathcal{L})$ over the signature $\sigma_1 \cup \sigma_2$ the mapping $$\{\langle A, B \rangle : A \in \text{mod}(\sigma_1), B \in \text{mod}(\sigma_2), (A, B) \models \Sigma_{12}\}.$$

$\sigma_1$ is the input (or source) signature, and $\sigma_2$ is the output (or target) signature. Without loss of generality, it is assumed that $\sigma_1$, $\sigma_2$ are disjoint or identical.

It is said that m is given by expression E if the mapping that corresponds to E is m. Furthermore, m is an $\mathcal{L}$-mapping if m is given by an expression ($\sigma_1$, $\sigma_2$, $\Sigma_{12}$) with $\Sigma_{12}$ a finite subset of IC($\mathcal{L}$).

Composition. Given two mappings $m_{12}$ and $m_{23}$, the composition $m_{12} \cdot m_{23}$ is the unique mapping $$\{<A,C>: \exists B (<A, B> \in m_{12} \land <B,C> \in m_{23})\}.$$

Deductions and Chase

Following are additional preliminaries provided to explain the algorithm and the correctness proofs in the following sections. The following fixes a specific deductive system, defines the standard notions of ⊢, DC (•), and chase (•), and gives Propositions 1 and 2.

Constraints in IC(SOCQ⁼) are written as rules of the form $$Q_1(\overline{x}) \to Q_2(\overline{x})$$

leaving the second-order quantifiers over Skolem functions and the outermost first-order universal quantifiers $\forall \overline{x}$ implicit. Call $Q_1(\overline{x})$ the premise and $Q_2(\overline{x})$ the conclusion. If the premise is empty, only the conclusion is written. Call rules of the form $Q_2(\overline{c})$, where $\overline{c}$ is a tuple of constants, facts.

Definition 1. A deduction from rules $\Sigma$ is a sequence of rules, each obtained in one of three ways:
1. by copying from $\Sigma$,
2. by expanding and/or renaming a rule appearing earlier in the sequence, or
3. by applying resolution on two rules appearing earlier in the sequence.

Such rules are called axiom rules, expand/rename rules, and resolution rules respectively.

A deductive procedure is the one that derives new rules using deductions. A deduction has length n if it consists of n lines. A rule r obtained by expand/rename from rule r' may have additional atoms in the premise, may have variables replaced consistently by arbitrary terms, and may have replacements in the conclusion consistent with equations in the premise. For example, $$R(xy), y=f(xy) \to S(xy)$$

is a valid result of applying expand/rename to $R(uv) \to S(u f(uv))$.

Two formulas can be unified when there exists a variable substitution that renders both formulas syntactically identical. Resolution is a complete logical inference procedure that derives a new rule from two given rules, when an atom of the premise of one rule can be unified with an atom in the conclusion of another rule. For example, $$R(xy), S(yz) \to S(xz)$$

is the result of applying resolution to rules $$R(xy) \to S(xy)$$

$$S(xy), S(yz) \to S(xz).$$

The example illustrates a special case of resolution known as modus ponens. A rule r obtained by applying modus ponens to rules r', r'' consists of the conclusion in r'' and the premise atoms in r', together with those in r'' which do not appear in the conclusion of r'.

Deductions are annotated by numbering the rules in ascending order and by adding justifications to each line indicating how that line was obtained. It is enough to justify a resolution rule with just two numbers and an expand/rename rule with a single number and a variable assignment. Axiom rules can be indicated through a lack of any other annotation. A variable assignment is a list of items of the form x:=y where x is a variable and y is a term.

EXAMPLE 1

Given $$\Delta = \{R(1, 1)\} \text{ and}$$

$$\Sigma = \{R(xy) \to S(xy), S(zz) \to T(zz)\},$$

the following is a valid deduction from $\Sigma \cup \Delta$:

| | | |
|---|---|---|
| 1. | R(1, 1) | |
| 2. | R(xy) → S(xy) | |
| 3. | R(1, 1) → S(1, 1) | [2] x := 1, y := 1 |
| 4. | S(1, 1) | [1, 3] |
| 5. | S(zz) → T(zz) | |
| 6. | S(1, 1) → T(1, 1) | [5] z := 1 |
| 7. | T(1, 1) | [4, 6] |

Here, rules 1, 2, and 5 are axioms, 3 and 6 are expand/rename, and 4 and 7 are resolution.

Within a deduction, a resolution step is called a $\sigma_2$-resolution if the resolution is performed by unifying an atom from the signature $\sigma_2$. The rule $\xi$ obtained by $\sigma_2$- resolution is called $\sigma_2$-resolvent. A rule $\xi$ is a variant of $\xi'$ if it can be deduced from $\xi'$ without using resolution.

Following is an introduction of prerequisites for proving the correctness of the composition algorithm and the undecidability results.

If there is a deduction from a set of constraints $\Sigma$ where the last line contains a constraint $\xi$, it can be said that $\xi$ is deduced from $\Sigma$, which is written $\Sigma \vdash \xi$. The $\mathcal{L}$-deductive closure of $\Sigma$ is $$DC(\mathcal{L}, \Sigma) := \{\xi \in \mathcal{L} : \Sigma \vdash \xi\}.$$

Write DC($\Sigma$) when $\mathcal{L}$ is clear from context. Write D⊨$\Sigma$ if all constraints in $\Sigma$ are true in D. Write $\Sigma \vDash \Sigma'$ if for all instances D, D⊨$\Sigma$ implies D⊨$\Sigma'$. It can be checked that if $\Sigma \vDash \Sigma'$, then also $\Sigma \vdash \Sigma'$; i.e., the deductive system is sound. A deductive system is called complete if it guarantees that if a set of sentences is unsatisfiable, then it will derive a contradiction. A deduction witnesses that the derived rules are implied by the axiom rules.

Proposition 1. If $\Delta$ is a set of facts, then the following are equivalent:
1. $\Sigma \cup \Delta \vdash \phi$.
2. There is $\xi$ such that $\Sigma \vdash \xi$ and $\Delta, \xi \vdash \phi$.

Proof. If (2) holds then there exist deductions $\gamma$ and $\gamma'$ witnessing $\Sigma \vdash \xi$ and $\Delta, \xi \vdash \phi$. Then $\gamma$ that witnesses $\Sigma \cup \Delta \vdash \phi$ is obtained by appending $\gamma'$ to $\gamma$. Now assume that (1) holds and $\gamma$ witnesses $\Sigma \cup \Delta \vdash \phi$. Set $\overline{\gamma}$ to $\gamma$ except for the following replacements, which are made rule by rule from the first rule in $\gamma$ to the last:
1. If rule r is an axiom rule from $\Delta$, then remove it.
2. If rule r is an axiom rule not from $\Delta$, then keep it as it is.
3. If rule r is obtained by expand/rename from rule i, then replace every constant c in r and in the variable assignment for r with the corresponding variable $v_c$.
4. If rule r is obtained by resolution from rules i and j, and rule i is an axiom rule from $\Delta$, then replace r with a trivial expand/rename from rule j.

5. If rule r is obtained by resolution from rules i and j, and rule i is not an axiom rule from r, then replace r with the result of applying resolution to the new rules i and j.

EXAMPLE 2

Given the deduction γ from Example 1, γ is:

| | | |
|---|---|---|
| 1. | <blank line> | |
| 2. | $R(xy) \rightarrow S(xy)$ | |
| 3. | $R(v_1 v_1) \rightarrow S(v_1 v_1)$ | [2] $x := v_1$ $y := v_1$ |
| 4. | $R(v_1 v_1) \rightarrow S(v_1 v_1)$ | [3] |
| 5. | $S(zz) \rightarrow T(zz)$ | |
| 6. | $S(v_1 v_1) \rightarrow T(v_1 v_1)$ | [5] $z := v_1$ |
| 7. | $R(v_1 v_1) \rightarrow T(v_1 v_1)$ | [4, 6] |

The following replacements have been made for each rule:
1. Axiom from Δ: removed by 1.
2. Axiom from Σ; unchanged by 2.
3. Expand rename: 1 replaced with $v_1$ by 3.
4. Resolution on 1, 3: trivial expand/rename by 4.
5. Axiom from Σ; unchanged by 2.
6. Expand rename: 1 replaced with $v_1$ by 3.
7. Resolution on 4, 6: resolution by 5.

γ is a valid deduction witnessing Σ⊢ξ since axioms from Δ are no longer used, and since replacements 1 through 5 above ensure that rule R is correctly deduced from the previously replaced rules. Additionally, Δ, ξ⊢R($\bar{c}$) is witnessed by a deduction γ' which consists of the following sequence, the axioms from Δ which were removed from γ to obtain γ', ξ followed by ξ' obtained from ξ by renaming each variables $v_c$ to the corresponding constant c, and a sequence of resolution steps using each axiom from Δ and starting with ξ'.

Definition 2. Given an instance D, the result of chasing D with constraints $\Sigma \subseteq IC(SOCQ^=)$ and the set of Skolem functions F is abbreviated by chase (D, Σ, F) and is denoted by the database D" obtained from $$D':=\{R_i(\bar{c}): \Sigma \cup \Delta \cup \Phi \vdash R_i(\bar{c})\}$$

where $\bar{c}$ is a tuple of constants,

Δ is the set of facts given by D:

$$\Delta := \{R_i(\bar{c}): D \vDash R_i(\bar{c})\}$$

and Φ is the set of facts given by F:

$$\Phi := \{f(\bar{c})=a: f \in F, f(\bar{c})=a\}$$

as follows. Define $c_0 \equiv c_1$ iff $\Sigma \cup \Delta \cup \Phi \vdash c_0 = c_1$.

Now to obtain D" from D', pick one constant $c_0$ from every equivalence class and replace every constant in that equivalence class with $c_0$. That is, D":=D'/≡. All functions in F are required to have the same domain. If they are finite, then chase (D, Σ, F) is finite. This definition is a variation on the usual definition, where the functions F are constructed during the chase process.

Proposition 2. Chase (D, Σ, F)⊨Σ.

Proof. Set D":=chase (D, Σ, F)⊭ξ and assume D"⊭ξ for some ξ∈Σ. This implies that there must be some assignment of constants $\bar{c}$ to the variables $\bar{x}$ in the premises so that the premise in ξ holds and the conclusion fails. Assume that the conclusion consists of a single relational atom R($\bar{y}$) or a single equation $y_1 = y_2$ where $\bar{y}$ is a sequence of terms over $\bar{x}$. Set $\bar{y}'$ to the sequence of terms obtained from $\bar{y}$ by replacing every variable in $\bar{x}$ with the corresponding constant $\bar{c}$. If the former holds then Δ∪Φ, ξ⊢R($\bar{y}'$) holds and R($\bar{y}'$) is not in D'. Since ξ∈Σ, Proposition 1 implies that Σ∪Δ∪Φ⊢R($\bar{y}'$) holds, contradicting the definition of D'. If the latter holds then Δ∪Φ, ξ⊢$y'_1 = y'_2$ and $y'_1 = y'_2$ holds. Since ξ∈Σ, Proposition 1 implies that Σ∪Δ∪Φ⊢$y'_1 = y'_2$ holds, contradicting the definition of ≡ and D".

Composition of $CQ_0^=$ -Mappings

The following description of composition begins by studying composition of $CQ_0$-mappings and $CQ_0^=$-mappings. Later, the techniques introduced to handle these cases are extended to handle $SOCQ^=$ and $CQ^=$-mappings. Necessary and sufficient, non-computable conditions for the composition of two $CQ_0^=$-mappings to be a $CQ_0^=$-mapping are given (see Theorem 1 below). Then, $CQ_0$ and $CQ_0^=$ are shown not to be closed under composition (see Example 3 below) and, furthermore, that determining whether the composition of two $CQ_0^=$-mappings is a $CQ_0^=$-mapping is undecidable (see Theorem 2 infra). An algorithm for composition ($CQ_0^=$ COMPOSE) is given, which works correctly on $CQ_0^=$-mappings satisfying the conditions of Theorem 3 infra, which can be checked in polynomial time. Also, a subset of $CQ_0^=$ recognizable in polynomial time, called good-$CQ_0^=$, is defined, which is closed under composition (see Theorem 4 infra).

The composition of two $CQ_0^=$-mappings given by ($\sigma_1$, $\sigma_2$, $\Sigma_{12}$) and ($\sigma_2$, $\sigma_3$, $\Sigma_{23}$) can be computed using the following algorithm:

Algorithm $CQ_0^=$ COMPOSE ($\Sigma_{12}, \Sigma_{23}$)

```
Set Σ := Σ₁₂ ∪ Σ₂₃
Repeat
    Set Σ' := ø
    For every pair ø, ψ ∈ Σ
        If there exists a σ₂-resolvent ξ of ø, ψ
        and there is no variant of ξ in Σ
            then set Σ' := Σ' ∪ {ξ}
    Set Σ := Σ ∪ Σ'
Until Σ' = ø
Return Σ₁₃ := Σ|σ₁₃
```

The next step is to verify the correctness of the algorithm and study the conditions under which the algorithm terminates. Notice that $CQ_0$ and $CQ_0^=$ are not closed under composition, as the following example shows.

EXAMPLE 3

Consider the $CQ_0$-mappings $m_{12}$ and $m_{23}$ given by ($\sigma_1$, $\sigma_2$, $\Sigma_{12}$) and ($\sigma_2$, $\sigma_3$, $\Sigma_{23}$) where $\Sigma_{12}$ is $R(xy) \rightarrow S(xy)$ $S(xy), S(yz) \rightarrow S(xz)$ and $\Sigma_{23}$ is $S(xy) \rightarrow T(xy)$ and where $\sigma_1 = \{R\}$, $\sigma_2 = \{S\}$, and $\sigma_3 = \{T\}$. Together, these constraints say that $R \subseteq S \subseteq T$ and that S is closed under transitive closure. This implies $tc(R) \subseteq T$, where $tc(R)$ denotes the transitive closure of R. It can be seen that the only $CQ_0^=$-constraints that hold between R and T are constraints of the form $R(x v_1), R(v_1, v_2), \ldots, R(v_{i-1}, v_i), R(v_i, y) \rightarrow T(xy)$ but no finite set of them expresses $tc(R) \subseteq T$.

In fact, the composition $m_{12} \cdot m_{23}$ is not even expressible in FO (first-order logic). Otherwise, given an FO sentence $\phi$ such that $$\langle R, T \rangle \in m_{12} \cdot m_{23} \text{ iff } (R,T) \vDash \phi$$

an FO formula $\psi(xy)$ can be created, which is obtained by replacing every occurrence of T(uv) in $\phi$ with $x \neq u \vee y \neq v$. Then given a domain D with $R \subseteq D^2$, $R \vDash \neg \psi[ab]$ iff $(R, D^2 - \langle a,b \rangle) \vDash \phi$ iff $tc(R) \subseteq D^2 - \langle a,b \rangle$ iff $\langle a,b \rangle \in tc(R)$ and therefore, $\forall (x,y) \neg \psi(x,y)$ says that R is a connected graph, which cannot be expressed in FO.

When is the composition of two $CQ_0^=$-mappings a $CQ_0^=$-mapping? Theorem 1 herein gives necessary and sufficient conditions. An obstacle for the composition to be a $CQ_0^=$-mapping can be recursion, yet recursion is not always a problem. In Theorem 3, sufficient conditions are provided that can be checked efficiently, and in Theorem 4, it is shown that good-$CQ_0^=$, a subset of $CQ_0^=$ defined below, is closed under composition. All these results also hold for $CQ_0$.

Theorem 1. If the $CQ_0^=$-mappings $m_1$, $m_2$ are given by ($\sigma_1$, $\sigma_2$, $\Sigma_{12}$) and ($\sigma_2$, $\sigma_3$, $\Sigma_{23}$) with $\Sigma_{123} := \Sigma_{12} \cup \Sigma_{23}$ and $\sigma_{13} = \sigma_1 \cup \sigma_3$, then the following are equivalent:

(1) There is a finite set of constraints $\Sigma_{13} \subseteq IC(CQ_0^=)$ over a signature $\sigma_{13}$ such that $m := m_1 \cdot m_2$ is given by ($\sigma_1$, $\sigma_3$, $\Sigma_{13}$).

(2) There is a finite set of constraints $\Sigma_{13} \subseteq IC(CQ_0^=)$ over the signature $\sigma_{13}$ such that $$DC(CQ_0^=, \Sigma_{123})|_{\sigma_{13}} = DC(CQ_0^=, \Sigma_{13})$$

(3) There is m such that for every $\xi$ over the signature $\sigma_{13}$ satisfying $\Sigma_{123} \vdash \xi$ there is a deduction of $\xi$ from $\Sigma_{123}$ using at most m $\sigma_2$-resolutions.

Proof. The proof uses Lemmas 1 and 2 below. The proof first shows the equivalence of (1) and (2), and then shows the equivalence of (2) and (3).

Assume (2) holds. Then $\langle A, C \rangle \in m_1 \cdot m_2$

| | |
|---|---|
| iff $\exists B (A, B, C) \vDash \Sigma_{123}$ | (by definition of $\cdot$) |
| iff $(A, C) \vDash DC(CQ_0^=, \Sigma_{123})|_{\sigma_{13}}$ | (by Lemma 1) |
| iff $(A, C) \vDash DC(CQ_0^=, \Sigma_{13})$ | (since (1) holds) |
| iff $(A, C) \vDash \Sigma_{13}$. | (by soundness of DC) |

This shows that (1) holds.

Conversely, assume (1) holds. Then $(A, C) \vDash DC(CQ_0^=, \Sigma_{123})|_{\sigma_{13}}$

| | |
|---|---|
| iff $\exists B (A, B, C) \vDash \Sigma_{123}$ | (by Lemma 1)) |
| iff $\langle A, B \rangle \in m_1 \cdot m_2$ | (by definition of $\cdot$) |
| iff $(A, C) \vDash \Sigma_{13}$ | (since (2) holds) |
| iff $(A, C) \vDash DC(CQ_0^-, \Sigma_{13})$. | (by soundness of DC) |

This shows that (2) holds.

Now assume (3) holds. Set $\Sigma$ to the set of all constraints in $DC(CQ_0^=, \Sigma_{123})|_{\sigma_{13}}$ which can be deduced using at most m $\sigma_2$-resolutions and no other resolutions. Every constraint in $\Sigma$ can be obtained by expand/rename from a finite subset $\Sigma_{13} \subseteq \Sigma$. It can be shown that (2) holds.

Assume that there is a deduction $\gamma$ witnessing $\Sigma_{123} \vdash \xi$. Since (3) holds, it can be assumed that $\gamma$ has m' $\sigma_2$-resolutions. By Lemma 2, there is a deduction $\gamma$ witnessing $\Sigma_{123} \vdash \xi$ also with m' $\sigma_2$-resolutions, and with all of them occurring before any other resolutions. Since the last line of $\gamma$ does not contain any symbols from $\sigma_2$, it can be assumed that $\gamma$ does not contain any lines containing symbols from $\sigma_2$ after the last $\sigma_2$-resolution.

Break $\gamma$ into two parts: $\gamma_1$ the initial segment of $\gamma$ up to and including the last $\sigma_2$-resolution; and $\gamma_2$ the remainder of $\gamma$. By definition of $\Sigma$, every constraint $\psi$ in $\gamma_1$ must be in $\Sigma$, and therefore $\Sigma_{13} \vdash \psi$ holds. Every constraint $\psi$ in $\gamma_2$ does not contain any symbols from $\sigma_2$, and $\Sigma_{123}|_{\sigma_{13}} \subseteq \Sigma_{13}$, which imply that $\Sigma_{13} \vdash \psi$. Therefore, $\Sigma_{13} \vdash \xi$ as desired.

Conversely, assume (2) holds. Take m to be the total number of $\sigma_2$-resolutions needed to deduce every $\psi \in \Sigma_{13}$ from $\Sigma_{123}$. Assume $\Sigma_{123} \vdash \xi$. Then there is a deduction $\gamma$ witnessing $\Sigma_{13} \vdash \xi$. Clearly, $\gamma$ has no $\sigma_2$-resolutions. From $\gamma$, one can obtain $\gamma$ witnessing $\Sigma_{123} \vdash \xi$ by appending to $\gamma$ a deduction of every constraint in $\Sigma_{13}$ and by replacing every line where an axiom from $\Sigma_{13}$ is used by a vacuous expand/rename of the line where the deduction of that axiom ends. Clearly, $\gamma$ has exactly m $\sigma_2$-resolutions as desired. This shows that (3) holds.

Lemma 1. Under the hypotheses of Theorem 1, the following are equivalent:

1. $(A, C) \vDash DC(CQ_0^=, \Sigma_{123})|_{\sigma_{13}}$.
2. $\exists B (A, B, C) \vDash \Sigma_{123}$.

Proof. Assume $(A, B, C) \vDash \Sigma_{123}$ for some B. Then $(A, C) \vDash DC(CQ_0^=, \Sigma_{123})$ (by soundness) and therefore $(A, C) \vDash DC(CQ_0^=, \Sigma_{123})|_{\sigma_{13}}$ since B is not mentioned in $DC(CQ_0^=, \Sigma_{123})|_{\sigma_{13}}$.

Conversely, assume $(A, C) \vDash DC(CQ_0^=, \Sigma_{123})|_{\sigma_{13}}$. Set $$(A', B', C) := \text{chase}((A, \emptyset, C), \Sigma_{123}).$$

If the chase terminates and $A = A'$ and $C = C'$, then $(A, B, C) \vDash \Sigma_{123}$ by Proposition 2, which implies $(A, B) \vDash \Sigma_{12}$ and $(B, C) \vDash \Sigma_{23}$, as desired.

It is clear that the chase terminates, since no new constants are introduced. Now assume, to get a contradiction, that $A \neq A'$ and $C \neq C'$. Set $\Delta_{AC}$ to the set of facts given by A and C. Then, $$\Sigma_{123} \cup \Delta_{AC} \vdash R(\bar{c})$$

where R is a relation in A or C not containing $\bar{c}$ or $$\Sigma_{123} \cup \Delta_{AC} \vdash c_0 = c_1$$

where $c_0$, $c_1$ are distinct constants in A or C.

Consider the former case; the latter is similar. If $\Sigma_{123} \cup \Delta_{AC} \vdash R(\bar{c})$ then by Proposition 1 there exists $\xi$ such that $\Sigma_{123} \vdash \xi$ and $\Delta_{AC}, \xi \vdash R(\bar{c})$. Since $(A,C) \vDash \Delta_{AC}$, it follows that $(A, C) \nvDash \xi$ and $\xi \in DC(CQ_0^=, \Sigma_{123})|_{\sigma_{13}}$, contradicting the initial assumption.

Lemma 2. Under the hypotheses of Theorem 1, if there is a deduction $\gamma$ witnessing $\Sigma_{123} \vdash \xi$ with at most m $\sigma_2$-resolutions, then there is $\gamma$ witnessing $\Sigma_{123} \vdash \xi$ with at most m $\sigma_2$-resolutions and where furthermore, all $\sigma_2$-resolutions occur before all other resolutions.

Proof. Assume k<m and $\gamma_{k,l}$ witness $\Sigma_{123} \vdash \xi$ with
1. exactly m $\sigma_2$-resolutions,
2. where the first k resolutions are $\sigma_2$-resolutions, and
3. where there are exactly l non-$\sigma_2$-resolutions before the k+1-th $\sigma_2$-resolution or the end of the deduction.

The proof proceeds by induction on k and l. Given $\gamma_{k,l}$ with l>0, the proof shows how to obtain $\gamma_{k,l-1}$. To prove the case where l=0, simply set $\gamma_{k+1,l'} := \gamma_{k,0}$ where l' fulfills the conditions above. Once $\gamma_{m,l'}$ is obtained for some l', set $\gamma := \gamma_{m,l'}$ and the lemma is proved.

Consider the line s containing $\delta$, the (k+1)th $\sigma_2$-resolution in $\gamma_{k,l}$ of, for example, lines i and j containing, respectively, $\alpha$ and $\beta$. Consider also the line r containing $\lambda$, the l-th non-$\sigma_2$-resolution in $\gamma_{k,l}$ of, for example, lines $r_1$ and $r_2$ containing, respectively, $\lambda_1$ and $\lambda_2$.

Now consider several cases. If i, j<r<s, then obtain $\gamma_{k,l-1}$ by moving line s to just before r. If lines i, j are not derived from line r, then obtain $\gamma_{k,l-1}$ by first rearranging $\gamma_{k,l}$ to $\gamma_{k,l}$ so that i, j<r<s, then proceeding as above.

Otherwise, either $\alpha$ or $\beta$ have been obtained through expand/rename from line r. To simplify the presentation, assume that both have been obtained through a single expand/rename from line r (the other cases are similar). There now exists r<i, j<s. By rearranging $\gamma_{k,l}$ if needed, assume i=r+1, j=r+2 and s=r+3. Since $\alpha$ and $\beta$ can be obtained from r by expand/rename, $\alpha_1$, $\alpha_2$ and $\beta_1$, $\beta_2$ can be obtained, respectively, from $r_1$, $r_2$ by expand/rename so that $\alpha$ is the resolution of $\alpha_1$, $\alpha_2$ and $\beta$ is the resolution of $\beta_1$, $\beta_2$. Replace the four contiguous lines r, i, j, s with the following seven lines.

| r | $\alpha_1$ | $[r_1]$ |
|---|---|---|
| r + 1 | $\alpha_2$ | $[r_2]$ |
| r + 2 | $\beta_1$ | $[r_1]$ |
| r + 3 | $\beta_2$ | $[r_2]$ |
| r + 4 | $\delta_1$ | $[r+1, r+2]$ |
| r + 5 | $\delta_2$ | $[r+4]$ |
| r + 6 | $\delta$ | $[r+5, r+3]$ |

An important point is that line r+4 now contains a $\sigma_2$-resolution, since $\alpha_2$ and $\beta_1$ must resolve through a relation symbol of $\sigma_2$, because $\alpha$ and $\beta$ do. Notice that $\delta$ is on line r+6, since the result of resolution on $\alpha_1$, $\alpha_2$, $\beta_1$ and $\beta_2$ is the same as the result of resolution on $\alpha$ and $\beta$ (this is because resolution is "associative").

Corollary 1. Under the hypotheses of Theorem 1, whenever $CQ_0^=$ COMPOSE ($\Sigma_{12}$, $\Sigma_{23}$) terminates, it yields $\Sigma_{13}$ such that $m_{12} \cdot m_{23}$ is given by ($\sigma_1$, $\sigma_3$, $\Sigma_{13}$).

Notice that after the m-th iteration of the main loop, $\Sigma$ will contain a variant of every constraint that can be deduced using at most m $\sigma_2$-resolution steps. The constraints of Example 3 fail to satisfy (3) of Theorem 1, and therefore, $CQ_0^=$ COMPOSE ($\Sigma_{12}$, $\Sigma_{23}$) will not terminate when $\Sigma_{12}$ and $\Sigma_{23}$ are as in Example 3 for input. In contrast, $CQ_0^=$ COMPOSE ($\Sigma_{12}$, $\Sigma_{23}$) will terminate on $\Sigma_{12}$, $\Sigma_{23}$ from the example below, which does satisfy (3) of Theorem 1, so recursion is not always bad.

EXAMPLE 4

Consider the $CQ_0$-mappings $m_{12}$ and $m_{23}$ given by ($\sigma_1$, $\sigma_2$, $\Sigma_{12}$) and ($\sigma_2$, $\sigma_3$, $\Sigma_{23}$) where $\Sigma_{12}$ is R(xy)→S(xy)

S(xy), S(yz)→R(xz), and $\Sigma_{23}$ is

S(xy)→T(xy), and where $\sigma_1 = \{R\}$, $\sigma_2 = \{S\}$, and $\sigma_3 = \{T\}$. Together, these constraints say that $R \subseteq S \subseteq T$, that R and S are closed under transitive closure (because the constraints S(xy), S(yz)→S(xz)

R(xy), R(yz)→R(xz)

can be deduced from the constraints above), and that R(xz) holds whenever S(xy), S(yz) holds. The constraints R(xy), R(yz)→R(xz)

R(xy)→T(xy)

express exactly the composition $m_1 \cdot m_2$, and are exactly those found by $CQ_0^=$ COMPOSE ($\Sigma_{12}$, $\Sigma_{23}$).

Theorem 2. Checking whether the composition of two $CQ_0$-mappings is a $CQ_0$-mapping is undecidable (in fact, coRE-hard). The same holds with $CQ_0^=$ instead of $CQ_0$.

Proof. The proof reduces Post's correspondence problem (PCP)—known to be undecidable—to the problem of deciding whether $m_{12} \cdot m_{23}$ is a $CQ_0$-mapping where $m_{12}$ and $m_{23}$ are $CQ_0$ mappings. Given a PCP problem, define $m_{23}$ so that there is a solution to the PCP problem iff $m_{12} \cdot m_{23}$ is not a $CQ_0$-mapping ($m_{12}$ does not depend on the PCP problem).

The $CQ_0$-mappings $m_{12} \cdot m_{23}$ are given by ($\sigma_1$, $\sigma_2$, $\Sigma_{12}$) and ($\sigma_2$, $\sigma_3$, $\Sigma_{23}$) where $\sigma_1 = \{A, B, O, Z\}$,
$\sigma_2 = \{\hat{A}, \hat{B}, \hat{O}, \hat{Z}\}$, and
$\sigma_3 = \{T\}$ with A, B unary and all other relations binary and with $\Sigma_{12}$ and $\Sigma_{23}$ as described below.

Write x0011y for the set of atoms

A(x), Z(xa), Z(ab), O(bc), O(cy), B(y)

over $\sigma_1$, which corresponds to a path from A to B through Z, O (stands for "zero" and O stands for "one"). Similarly, write $_{x'}$x0011$_{y'}$y for the set of atoms $\hat{A}$(xx'), $\hat{Z}$(xa), $\hat{Z}$(ab), $\hat{O}$(bc), $\hat{Z}$(cy), $\hat{Z}$(x'a'), $\hat{Z}$(a'b'), $\hat{O}$(b'c'), $\hat{O}$(c'y'), $\hat{B}$(yy')

over $\sigma_2$. $\Sigma_{12}$ contains the constraint

A(x), Z(xy), A (x'), Z(x'y')→$\hat{A}$(xx'), $\hat{Z}$(xy), $\hat{Z}$(x'y')

and all corresponding constraints for all combinations AO, ZZ, ZO, OZ, OO, ZB, OB. These constraints imply that xSy, x'Sy'→$_{x'}$xS$_{y'}$y can be deduced for any string S.

Encode each PCP "domino" by a constraint in $\Sigma_{23}$ as follows. For example, encode the domino 0011/011 as the constraint $\hat{A}$(xx'), $\hat{Z}$(xa), $\hat{Z}$(ab), $\hat{O}$(bc), $\hat{O}$(cy), $\hat{Z}$(x'a'), $\hat{O}$(a'b'), $\hat{O}$(b'y')→$\hat{A}$(xx'), $\hat{A}$(yy')

Finally, add to $\Sigma_{23}$ the constraint $\hat{A}$(xx'), $\hat{A}$(yy'), $\hat{B}$(yy')→$\hat{T}$(xy).

Now assume that the PCP problem has a solution for the string S over $\{0, 1\}^*$. Then deduce infinitely many constraints of the form $xS^k y$, $x'S^k y'$→T(xy)

where $S^k$ is the string S repeated k times as follows. Notice that these constraints are over $\sigma_1 \cup \sigma_3$ and that none of them can be obtained from any other.

For k=1 (the other cases are similar), first obtain xSy, x'SyS→$_{x'}$xS$_{y'}$y by using the constraints in $\Sigma_{12}$, and then obtain xSy, x'SyS→A(xx'), A(yy'), B(yy')

by resolution, in order, using the rules in $\Sigma_{23}$ which correspond to the sequence of blocks necessary to obtain S. Finally, obtain xSy, x'SyS→T(x,y)

using the last constraint in $\Sigma_{23}$.

Conversely, if the PCP problem has no solutions, no deduction with premise in $\sigma_1 \cup \sigma_3$ and conclusion $$\hat{A}(xx'), \hat{A}(yy'), \hat{B}(yy')$$

is possible. Since this is the only premise matching a conclusion in $\sigma_1 \cup \sigma_3$, no constraints in $\sigma_1 \cup \sigma_3$ are deduced. In this case $\Sigma_{13} = \emptyset$ gives the composition $m_{12} \cdot m_{23}$.

The coRE-hardness from Theorem 2 implies that algorithm $CQ_0^=$ COMPOSE may not terminate even when the composition is a $CQ_0^=$-mapping. This happens, for example, in the following case.

EXAMPLE 5

Consider the $CQ_0$-mappings $m_{12}$ and $m_{23}$ given by $(\sigma_1, \sigma_2, \Sigma_{12})$ and $(\sigma_2, \sigma_3, \Sigma_{23})$ where $\Sigma_{12}$ is $R(xy) \to S(xy)$ $R(xy), R(yz) \to R(xz), R'(y)$ $S(xy), S(yz) \to S(xz), S'(y)$ and $\Sigma_{23}$ is $S(xy) \to T(xy)$ and where $\sigma_1 = \{R, R'\}$, $\sigma_2 = \{S, S'\}$, and $\sigma_3 = \{T\}$. The constraints $R(xy), R(yz) \to R(xz), R(y)$ $R(xy) \to T(xy)$ express exactly the composition $m_1 \cdot m_2$, but algorithm $CQ_0^=$ COMPOSE will never terminate, since it will deduce the infinitely many constraints it would deduce in Example 3.

The following conditions are sufficient for algorithm $CQ_0^=$ COMPOSE to terminate. These conditions can be checked in polynomial time, as follows. Run $k_{o2} - 1$ iterations of $CQ_0^=$ COMPOSE $(\Sigma_{12}, \Sigma_{23})$ where $k_{o2}$ is the number of relation symbols in $\sigma_2$, and check whether a constraint of the form given below appears in $\Sigma$.

Theorem 3. Under the hypotheses of Theorem 1, if no constraint of the form $\phi(\bar{z}), S(\bar{y}) \to S(\bar{x})$ where
1. $\phi(\bar{z})$ is a conjunction of atoms over $\sigma_{123}$,
2. there is no atom $S(\bar{w})$ in $\phi(\bar{z})$ with $\{\bar{x}\} \subseteq \{\bar{w}\}$,
3. $\{\bar{x}\} \not\subseteq \{\bar{y}\}$, and
4. S is a relation symbol in $\sigma_2$ can be deduced from $\Sigma_{123}$ using only $\sigma_2$-unifications (this is called a bad constraint), then $CQ_0^=$ COMPOSE $(\Sigma_{12}, \Sigma_{23})$ terminates, and therefore, $m_1 \cdot m_2$ is a $CQ_0^=$-mapping. The same holds for $CQ_0$-mappings.

Proof. Assume the hypotheses hold. Consider any deduction $\gamma$ witnessing $\Sigma_{123} \vdash \xi$ which uses only $\sigma_2$-unifications where $\xi$ contains a $\sigma_2$ atom in the conclusion. Assume without loss of generality that all rename operations are performed first, followed by all resolution operations. Assume also that every rule in $\gamma$ contains a single atom in its conclusion and that every rule is used in at most one resolution step.

Such a deduction can be represented as a tree T where every node is one atom. Every non-leaf node in T is the conclusion of some rule r. The children of r are the atoms in the premise of rule r. The premise of $\xi$ consists of all the leaves of T and its conclusion is the root of T.

It is easy to check that any subtree T' of T which contains, for every node, either all its children in T or none of them, can be converted into a deduction $\gamma$ witnessing $\Sigma_{123} \vdash \xi'$ where the premise of $\xi'$ consists of all the leaves of T' and its conclusion is the root of T'.

Since the hypothesis holds, no such subtree may contain $S(\bar{x})$ as its root and $S(\bar{y})$ as a leaf where S is a relation symbol in $\sigma_2$ and $\bar{x} \not\subseteq \bar{y}$. Therefore, any path from the leaves to the root in T containing a node $S(\bar{y})$ may only contain at most $2^r r!^8$ other nodes with S atoms where r is the arity of S. This means that any such path must have length bounded by $k_{o2} 2^r \sigma_2 r_{o2}!$ where $k_{o2}$ is the number of relation symbols in $\sigma_2$ and $r_{o2}$ is the maximum arity of a relation symbols in $\sigma_2$. As a result, up to variants, there is only a finite number of conclusions of $\Sigma_{123}$ obtainable through $\sigma_2$-unifications and this implies that $CQ_0^=$ COMPOSE $(\Sigma_{12}, \Sigma_{23})$ terminates.

Definition 3. A $CQ_0^=$-mapping is a good-$CQ_0^=$-mapping if it is given by $(\sigma_1, \sigma_2, \Sigma_{12})$ such that no constraint of the form $\phi(\bar{z}), S(\bar{y}) \to S(\bar{x})$ where
1. $\phi(\bar{z})$ is a conjunction of atoms over or $\sigma_1 \cup \sigma_2$
2. there is no atom $S(\bar{w})$ in $\phi(\bar{z})$ with $\{\bar{x}\} \subseteq \{\bar{w}\}$,
3. $\{\bar{x}\} \not\subseteq \{\bar{y}\}$, and
4. S and S' are both relation symbol in $\sigma_1$ or both in $\sigma_2$ can be deduced from $\Sigma_{123}$ using only $\sigma_1$-unifications or only $\sigma_2$-unifications. Define good-$CQ_0$ similarly.

Theorem 4. Good-$CQ_0^=$ and good-$CQ_0$ are closed under composition and inverse.

Comment 1. $CQ_0^=$-queries are included in good-$CQ_0^=$-mappings. Notice that total and surjective $CQ_0^=$-mappings are not closed under composition.

EXAMPLE 6

Consider the $CQ_0$-mappings $m_{12}$ and $m_{23}$ given by $(\sigma_1, \sigma_2, \Sigma_{12})$ and $(\sigma_2, \sigma_3, \Sigma_{23})$ where $\Sigma_{12}$ is $R(xy) \to S(xy)$ $R(xy), S(yz) \to S(xz)$ and $\Sigma_{23}$ is $S(xy) \to T(xy)$ and where $\sigma_1 = \{R\}$, $\sigma_2 = \{S\}$, and $\sigma_3 = \{T\}$. Here $m_{12}$ and $m_{23}$ are total and surjective and their composition says that $tc(R) \subseteq T$, which can be seen in Example 5, is not expressible even in FO.

Composition of SOCQ$^=$-Mappings

The focus of this section is the composition of SOCQ$^=$-mappings. In order to handle existential quantifiers in CQ$^=$-mappings, first convert CQ$^=$-mappings constraints into Skolem form, which yields SOCQ$^=$-mappings. Theorem 5 below shows that SOCQ$^=$-mappings are closed under composition, because it can assert the existence of the relations in the intermediate signature or $\sigma_2$ using existentially-quantified function symbols.

The following related question is also very important:
If the SOCQ$^=$-mappings $m_{12}, m_{23}$ are given by $(\sigma_1, \sigma_2, \Sigma_{12})$ and $(\sigma_2, \sigma_3, \Sigma_{23})$, is there a SOCQ$^=$-mapping $m_{13}$ given by $(\sigma_1, \sigma_3, \Sigma_{13})$ satisfying $m_{13} = m_{12} \cdot m_{23}$ such that $\Sigma_{13} \subseteq$ SOCQ$^=$ has no function symbols or constants other than those appearing in $\Sigma_{12} \cup \Sigma_{23}$? If so, it is said that m12 and m23 have a conservative composition.

Conservative composition is important because ultimately there is a need to eliminate all function symbols to obtain CQ$^=$-mappings, and it is not known how to eliminate function symbols introduced in equations such as those used in the proof of Theorem 5 below. Theorems 1 and 2 from the previous section show that SOCQ and SOCQ$^=$ are not closed under conservative composition, and that determining whether the conservative composition of two $SOCQ^=$-mappings is a $SOCQ^=$-mapping is undecidable. As in the case of $CQ_0^=$-mappings, necessary and sufficient non-computable conditions are given for two $SOCQ^=$-mappings to have a conservative composition (see Theorem 6 below), and sufficient conditions for conservative composition are given that can be checked efficiently. An algorithm for conservative composition ($SOCQ^=$ COMPOSE) is given which works correctly on $SOCQ^=$-mappings, satisfying these conditions. Additionally, good-$SOCQ^=$ is defined as a polynomial-time subset of $SOCQ^=$, which is closed under conservative composition. In contrast with the previous section, it turns out that in this case, equations are essential and therefore, these results do not hold for SOCQ.

Before proceeding to the results, the semantics of $IC(SOCQ^=)$ constraints are briefly described. A question is, what is the universe from which the functions can take values, i.e., what is their allowed range? Intuitively, the problem is with the universe of the existentially quantified intermediate database. All databases are required to be finite (i.e., all relations are finite), but to have an implicit countably infinite universe. The functions are allowed to take any values from this implicit universe, as long as their range is finite. These assumptions ensure that the deductive system introduced in Section 2 is sound for $IC(SOCQ^=)$, which is needed for Theorem 6 below.

Theorem 5. $SOCQ^=$-mappings are closed under composition. Proof. If $SOCQ^=$-mappings $m_{12}$ and $m_{23}$ are given by $(\sigma_1, \sigma_2, \Sigma_{12})$ and $(\sigma_2, \sigma_3, \Sigma_{23})$, $\Sigma_{13}$ is obtained such that the composition $m_{12} \cdot m_{23}$ is given by $(\sigma_1, \sigma_2, \Sigma_{23})$ as follows. Set $\Sigma_{13} := \Sigma'_{12} \cup \Sigma'_{23}$ where $\Sigma'_{12}$ and $\Sigma'_{23}$ are obtained from $\Sigma_{12}$ and $\Sigma_{23}$ by replacing every occurrence of an atom $R(\bar{x})$ where $R \in \sigma_2$ with $\text{fin}(\bar{x})$, $g_R(\bar{x}) = h_R(\bar{x})$, where $\text{fin}(\bar{x}) := \Lambda_{x \in \{\bar{x}\}} x = f(x)$, and $f$, $g_R$, $h_R$ are new function symbols.

Then if $\langle A,C \rangle \in m_{12} \cdot m_{23}$, then there is a B such that $(A,B) \vDash m_{12}$ and $(B,C) \vDash m_{23}$. Set $g_R(\bar{c}) = h_R(\bar{c})$ iff $R(\bar{c})$ holds in B for every relation R in $\sigma_2$ by using any two values from the domain. Furthermore, set $f(c) := c$, if c is in the active domain of B and $f(c) := c'$, otherwise, where $c'$ is some value from the domain. Then $(A,C) \vDash \Sigma_{13}$. Conversely, if $(A,C) \vDash \Sigma_{13}$, then set $R := \{\bar{c}: \text{fin}(\bar{c}), g_R(\bar{c}) = h_R(\bar{c})\}$ for every relation R in $\sigma_2$ to obtain B such that $(A,B) \vDash m_{12}$ and $(B,C) \vDash m_{23}$. $\text{fin}(\bar{x})$ is a finite predicate, since the range of $f$ is finite. Hence, every relation R in B is finite.

Theorem 6. If the $SOCQ^=$-mappings $m_{12}$, $m_{23}$ are given by $(\sigma_1, \sigma_2, \Sigma_{12})$ and $(\sigma_2, \sigma_3, \Sigma_{23})$ with $\Sigma_{123} := \Sigma_{12} \cup \Sigma_{23}$ and $\sigma_{13} = \sigma_1 \cup \sigma_3$, then the following are equivalent;
1. There is a finite set of constraints $\Sigma_{13} \subseteq IC(SOCQ^=)$ over the signature $\sigma_3$ such that $m := m_{12} \cdot m_{23}$ is given by $(\sigma_1, \sigma_3, \Sigma_{13})$ where $\Sigma_{13}$ has no function symbols or constants other than those appearing in $\Sigma_{123}$.
2. There is a finite set of constraints $\Sigma_{13} \subseteq IC(SOCQ^=)$ over the signature $\sigma_{13}$ such that $DC(SOCQ^=, \Sigma_{123})|_{\sigma_{13}} = DC(SOCQ^=, \Sigma_{13})$ where $\Sigma_{13}$ has no function symbols or constants other than those appearing in $\Sigma_{123}$.
3. There is k such that for every $\xi$ over $\sigma_{13}$ satisfying $\Sigma_{123} \vdash \xi$ there is a deduction of $\xi$ from $\Sigma_{123}$ using at most k $\sigma_2$-resolutions.

Proof: Essentially the same as that of Theorem 3, using Lemma 3 below instead of Lemma 1.

Lemma 3. Under the hypotheses of Theorem 6, the following are equivalent:
1. $(A,C) \vDash DC(SOCQ^=, \Sigma_{123})|_{\sigma_{13}}$.
2. $\exists B \ (A, B, C) \vDash \Sigma_{123}$.

Theorem 6 suggests essentially the same algorithm for composition of $SOCQ^=$-mappings as $CQ_0^=$ COMPOSE; call it $SOCQ^=$ COMPOSE. The only difference between them is that $SOCQ^=$ COMPOSE operates on $IC(SOCQ^=)$ constraints while $CQ_0^=$ COMPOSE operates on $IC(CQ_0^=)$ constraints. Correctness of $SOCQ^=$ COMPOSE, sufficient conditions for its termination, and good-$SOCQ^=$-mappings are defined for $SOCQ^=$ just like for $CQ_0^=$.

Composition of $CQ^=$-Mappings

This section considers how to convert $SOCQ^=$-mappings back to $CQ^=$-mappings. Consider the case of $CQ^=$-mappings and $CQ^=$-mappings. In order to compute the composition of two $CQ^=$-mappings $m_{12}$, $m_{23}$ given by $(\sigma_1, \sigma_2, \Sigma_{12})$ and $(\sigma_2, \sigma_3, \Sigma_{23})$ progress is in three steps, as follows.

Procedure $CQ^=$ COMPOSE $(\Sigma_{12}, \Sigma_{23})$
1. $\Sigma'_{12} := \text{SKOLEMIZE}(\Sigma_{12})$
   $\Sigma'_{23} := \text{SKOLEMIZE}(\Sigma_{23})$
2. $\Sigma'_{13} := SOCQ^= \text{ COMPOSE}(\Sigma'_{12}, \Sigma_{23})$
3. Return $\text{DESKOLEMIZE}(\Sigma'_{13})$ The first step, SKOLEMIZE, is straightforward. The second step, $SOCQ^=$ COMPOSE, has been discussed in the previous section. For the third step, DESKOLEMIZE, an algorithm is given below which is shown to be correct (see Theorem 7). It is shown that even if the second step succeeds, it may be impossible to find $\Sigma_{13} \subseteq IC(CQ^=)$ such that $\Sigma'_{13} \equiv \Sigma_{13}$ (see Example 4). Thus, a necessary and sufficient polynomial-time checkable condition is identified for the third step to succeed (see Proposition 2). DESKOLEMIZE may produce a result of size exponential in the size of its input. It is shown that in the general case, this is unavoidable (see Theorem 8), yet polynomial-time checkable conditions are provided for DESKOLEMIZE to run in polynomial time in the size of its input (see Proposition 2).

The following example, from prior art, shows that de-Skolemization is not always possible.

EXAMPLE 7

Consider the $CQ^=$-mappings $m_{12}$ and $m_{23}$ given by $(\sigma_1, \sigma_2, \Sigma_{12})$ and $(\sigma_2, \sigma_3, \Sigma_{23})$ where
$\Sigma_{12}$ is $E(x, y) \rightarrow F(x, y)$
$E(x, y) \rightarrow \exists u C(x, u)$
$E(x, y) \rightarrow \exists v C(y, v)$
$\Sigma_{23}$ is $F(x, y), C(x, u), C(y, v) \rightarrow D(u, v)$ and where $\sigma_1 = \{E\}$, $\sigma_2 = \{F, C\}$, and $\sigma_3 = \{D\}$. Here, Steps 1 and 2 of $CQ^=$ COMPOSE succeed, but Step 3 fails no matter what algorithm is used for it, since $m_{12} \cdot m_{23}$ is not a $CQ^=$-mapping, as shown in the art.

Figure 8:
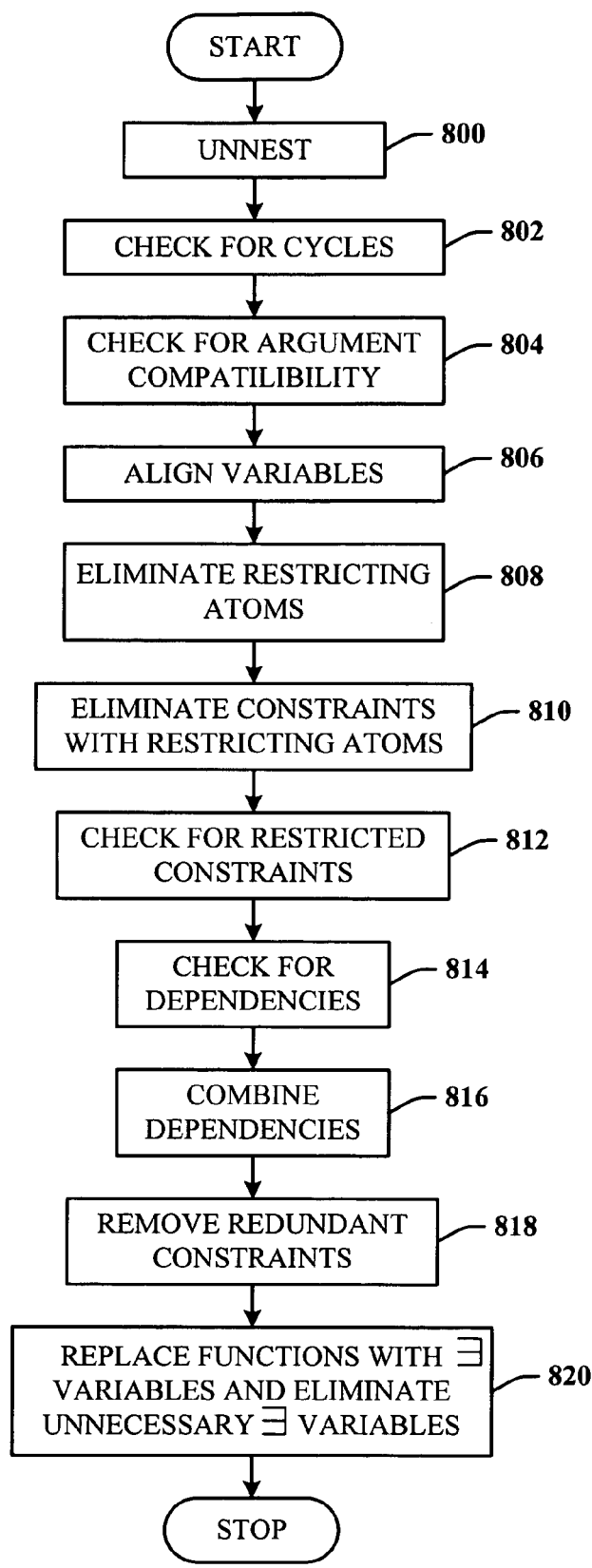
FIG. 8 illustrates a methodology for de-Skolemization in accordance with the subject invention.

The algorithm DESKOLEMIZE which is presented below depends on $\vdash^*$, which is some polynomial-time approximation of $\vdash$. That is, if $\Sigma \vdash^* \phi$, then $\Sigma \vdash \phi$. The converse may not hold. There are known cases in which there exists such $\vdash^*$ which is also complete (i.e., the converse does hold). For example, this is the case when $\Sigma$ has stratified witnesses. For sake of brevity, options for the implementation of $\vdash^*$ are not described. DESKOLEMIZE works for any $\vdash^*$ satisfying the condition above; the more complete $\vdash^*$ is, the larger the set of inputs on which DESKOLEMIZE succeeds. Accordingly, FIG. 8 illustrates a methodology for de-Skolemization in accordance with the subject invention.

Procedure DESKOLEMIZE $(\Sigma)$

At 800, an unnesting process is initiated. Set $\Lambda_1 := \{\phi' : \phi \in \Sigma\}$ where $\phi'$ is equivalent to and obtained from $\phi$ by "unnesting" terms and eliminating terms from relational atoms and from the conclusion so that in $\phi$:
(a) Function symbols occur only in equations in the premise.
(b) Every term $f(\bar{u})$ occurs in only one atom.

(c) Every equation is of the form $v=f(\bar{u})$ for some variable v (a term variable for $f$), function $f$, and sequence of variables $\bar{u}$ (a defining equation) or of the form v=u for two term variables u and v (a restricting equation).

(d) The conclusion contains at most one atom, which is not a defining equation.

Relational atoms in which a term variable occurs are called restricting atoms. If A is a restricting relational atom or a restricting equation in which v occurs, where v is a term variable for $f$, A is called an $f$-restricting atom. A constraint is called restricted if it has restricting atoms in the premise.

At 802, a check for cycles is performed. For every $\phi \in \Lambda_1$, construct the graph $G_\phi$ where the edges are variables in $\phi$ and where there is an edge (v, u) iff there is an equation of the form $v=f(\ldots u \ldots)$. If $G_\phi$ has a cycle, abort. Otherwise, set $\Lambda_2:=\Lambda_1$.

At 804, a check for argument compatibility is performed. For every $\phi \in \Lambda_2$, check that $\phi$ does not contain two atoms with the same function symbol. If it does, abort. Otherwise, set $\Lambda_3:=\Lambda_2$.

At 806, variables are aligned. Rename the variables in $\Lambda_3$ to obtain $\Lambda_4$ satisfying:

(a) For every function symbol $\theta$ and any two equations of the form $v=f(\bar{u})$ and $y=f(\bar{x})$ in $\theta_4$, v is the same variable as y and $\bar{u}$ is the same sequence of variables as $\bar{x}$.

(b) For every two different function symbols $f$ and g and any two equations of the form $v=f(\bar{u})$ and $y=g(\bar{x})$ in $\Lambda_4$, v and y are different variables.

If this is not possible, abort.

At 808, restricting atoms are eliminated. Pick some ordering of the function symbols in $\Lambda_4$: $f_1, \ldots f_k$. Set $\Delta_0=\Lambda_4$. For $n=1, \ldots, k-1$, set $\Delta_{n+1}:=\{\phi':\phi \in \Delta_n\}$ where $\phi'$ is obtained from $\phi$ as follows. Set $\psi$ to be $\phi$ with the $f_{n+1}$-restricting atoms removed from the premise. If $\Delta_n \vdash^* \psi$, set $\phi':=\psi$; otherwise set $\phi':=\phi$. In any case, $\Delta_{n+1} \equiv \Delta_n$. Set $\Lambda_5:=\Delta_k$.

At 810, constraints with restricting atoms are eliminated. Set $\Lambda_6$ to be the set of constraints $\phi \in \Lambda_5$ which can not be eliminated according to the following test: $\phi$ can be eliminated if (a) $\phi$ contains an $f$-restricting atom in the premise, and
(b) there is no constraint $\psi \in \Lambda_5$ which has an $f$-restricting atom in the conclusion and no $f$-restricting atoms in the premise.

At 812, a check for restricted constraints is performed. Set $\Lambda$ to the set of unrestricted constraints in $\Lambda_6$. If there is any $\phi \in \Lambda_6$ such that $\Lambda \not\vdash^* \phi$, abort. Otherwise, set $\Lambda_7:=\Lambda$.

At 814, a check for dependencies is performed. For every $\phi \in \Lambda_7$ and every variable v in $\phi$, define $D_{\phi,v}$ as follows. If v is not a term variable, set $D_{\phi,v}=\{v\}$. If v is a term variable and $v=f(\bar{u})$ is its defining equation in $\phi$, then set $D_{\phi,v}:=\bigcup_{u \in \{\bar{u}\}} D_{\phi,u}$. Intuitively, $D_{\phi,v}$ is the set of variables on which v depends. Set $V_\phi:=$ the set of variables which appear in the conclusion of $\phi$. For every term variable v in $V_\phi$, check that $D_{\phi,v}=\bigcup_{u \in V_\phi} D_{\phi,u}$. If this fails, abort. Otherwise, set $\Lambda_8:=\Lambda_7$.

At 816, dependencies are combined. Set $\Lambda_9:=\{\psi_\Phi: \emptyset \neq \Phi \subseteq \Lambda_8\}$ where $\psi_\Phi$ is defined as follows. If there is a function $f$ which appears in every $\phi \in \Phi$, then the premise of $\psi_\Phi$ consists of the atoms in all the premises in $\Phi$ and the conclusion of $\psi_\Phi$ consists of the atoms in all the conclusions of $\Phi$ (remove duplicate atoms). Otherwise, $\psi_\Phi$ is some constraint in $\Phi$. Notice that $\Lambda_9 \subseteq \Lambda_8$ since $\psi_{\{\phi\}}=\phi$.

At 818, redundant constraints are removed. Pick some set $\Lambda_{10} \subseteq \Lambda_9$ such that $\Lambda_{10} \vdash \phi$ for every $\phi \in \Lambda_g$, and such that this does not hold for any proper subset of $\Lambda_{10}$.

Additionally, at 818, functions with $\exists$ variables are replaced. Set $\Lambda_{11}:=\{\phi':\phi \in \Lambda_{10}\}$ where the premise of $\phi'$ is the premise of $\phi$ with all equations removed and where the conclusion of $\phi'$ is the conclusion of $\phi$, with all variables appearing on the left of equations in $\phi$ existentially quantified.

At 820, unnecessary $\exists$ variables are eliminated. Set $\Lambda_{12}:=\{\phi':\phi \in \Lambda_{11}\}$ and return $\Lambda_{12}$ where $\phi'$ is like $\phi$, but where existentially quantified variables which do not appear in the conclusion atom have been removed (with their corresponding existential quantifier).

EXAMPLE 8

Consider three runs of the algorithm DeSkolemize $(\Sigma_{13}{}^i)$, for $i \in \{1, 2, 3\}$. Let $\Sigma_{13}{}^i=\{\gamma_1, \ldots, \gamma_i\}$ be a set of the following (unnested) SOCQ$^=$-dependencies:

| | |
|---|---|
| $\gamma_1$ | $R_1(y), R_2(x), y = f(x) \rightarrow T_1(x)$ |
| $\gamma_2$ | $R_2(x), y = f(x) \rightarrow T_2(y)$ |
| $\gamma_3$ | $R_2(x), y = f(x) \rightarrow R_1(y)$ |

For completeness, note that each $\Sigma_{13}{}^i$ is obtained by first de-Skolemizing CQ$^=$-mappings given by $\Sigma_{12}{}^i$ and $\Sigma_{23}{}^i$, which are shown below, and then invoking SOCQ$^=$ Compose:

| i | $\Sigma_{12}{}^i$ | $\Sigma_{23}{}^i$ | $\Sigma_{13}{}^i$ |
|---|---|---|---|
| 1. | $\{\alpha_1, \alpha_2\}$ | $\{\beta_2\}$ | $\{\gamma_1\}$ |
| 2. | $\{\alpha_1, \alpha_2\}$ | $\{\beta_1, \beta_2\}$ | $\{\gamma_1, \gamma_2\}$ |
| 3. | $\{\alpha_1, \alpha_2, \alpha_3\}$ | $\{\beta_1, \beta_2\}$ | $\{\gamma_1, \gamma_2, \gamma_3\}$ |

Dependencies $\alpha_1, \alpha_2, \alpha_3, \beta_1, \beta_2$ are specified as:

| | |
|---|---|
| $\alpha_1$ | $R_1(x) \rightarrow S_1(x)$ |
| $\alpha_2$ | $R_2(y) \rightarrow \exists z(S_2(zy))$ |
| $\alpha_3$ | $S_2(zy) \rightarrow R_1(z)$ |
| $\beta_1$ | $S_2(zy) \rightarrow T_2(z)$ |
| $\beta_2$ | $S_1(x), S_2(xy) \rightarrow T_1(y)$ |

In all three runs of DeSkolemize $(\Sigma_{13}{}^i)$, processes 802 and 804 pass, since each of $\gamma_1, \gamma_2, \gamma_3$ is cycle-free and has no multiple atoms with the same function symbol. Process 806 has no effect, since the variable names of the dependencies are already aligned. The remaining processes are explained below.

In the run DeSkolemize $(\{\gamma_1\})$, process 808 has no effect, because $\{\gamma_1\}$ is a singleton set. Its only member $\gamma_1$ gets eliminated in process 810, since there are no rules in $\{\gamma_1\}$ with $f$-restricting atoms in conclusions. Intuitively, $\gamma_1$ is a tautology because an $f$ can be constructed whose range is disjoint with $R_1$. Hence, $\{\gamma_1\}$ is equivalent to the empty set of constraints, which is trivially in IC(CQ).

In the run DeSkolemize $(\{\gamma_1, \gamma_2\})$, $\gamma_2$ contains an $f$-restricting atom $T_2$ in its conclusion. Hence, the restricted constraint $\gamma_1$ can not be eliminated in process 810, and so de-Skolemization aborts in process 812.

In the run DeSkolemize $(\{\gamma_1, \gamma_2, \gamma_3\})$, de-Skolemization is possible despite $\gamma_2$. In process 808, $\Delta_0=\{\gamma_1, \gamma_2, \gamma_3\}$. By considering the only function symbol $\theta$ get $\Delta_1=\{\psi, \gamma_2, \gamma_3\} \equiv \Delta_0$ where $\psi$ is obtained by eliminating the restricting atom $R_1(y)$ from the premise of $\gamma_1$ as $$\psi:=R_2(x), y=f(x) \rightarrow T_1(x).$$

Clearly, $\Delta_0 \vdash^* \psi$, since $\Delta_0 \supseteq \{\gamma_1, \gamma_3\} \vdash^* \psi$. $\Delta_1$ has no restricting constraints, so process 810 has no effect and process 812 passes. Process 814 succeeds with $\Lambda_8=\Lambda_7=\{\psi, \gamma_2, \gamma_3\}$, since every dependency in $\Delta_1$ has at most one term variable y in its conclusion. For example, doing the calculation for $\gamma_3$ yields $V_{\gamma_3}=\{x, y\}$, $D_{\gamma_3,x}=D_{\gamma_3,y}=\cup_{u\in V\gamma_3}D_{\gamma_3,u}=\{x\}$. In process 816, combining the dependencies for $\Phi=\Lambda_8$ yields $$\gamma_4 := R_1(y), R_2(x), y=f(x) \to T_1(x), T_2(y), R_1(y)$$

(Combinations resulting from proper subsets of $\Lambda_8$ are not shown for brevity.) In process 818, the redundant constraints which include $\psi, \gamma_2, \gamma_3$ are removed because they share the premise with $\gamma_4$ and their conclusion is subsumed by that of $\gamma_4$; the result is $\Lambda_{10}=\{\gamma_4\}$. Finally, at 818, replacing function $f$ by an existential variable in $\gamma_4$ yields $$\Lambda_{12}=\{R_2(x) \to \exists y (T_1(x)\char`\^ T_2(y)\char`\^ R_1(y))\}$$

Thus, DESKOLEMIZE $(\{\gamma_1, \gamma_2, \gamma_3\}) \subseteq IC(CQ)$.

Theorem 7. If DESKOLEMIZE ($\Sigma$) succeeds on input $\Sigma \subseteq IC(SOCQ^=)$, then $\Sigma':=$ DESKOLEMIZE ($\Sigma$) satisfies $$\Sigma' \subseteq IC(CQ^=) \text{ and } \Sigma' \equiv \Sigma.$$

The following follows from the description of the algorithm.
Proposition 3.
1. DESKOLEMIZE ($\Sigma$) succeeds on input $\Sigma \subseteq IC(SOCQ^=)$ iff it reaches process 816, which can be checked in polynomial time in the size of $\Sigma$.
2. Furthermore, if for some constant l independent of $\Sigma$, for every function symbol in $\Lambda_8$ there are no more than l rules in $\Lambda_8$ in which $f$ occurs, then DESKOLEMIZE ($\Sigma$) runs in polynomial time in the size of $\Sigma$.

From the first part of Proposition 3, it follows that sufficient conditions for success of $CQ^=$ COMPOSE ($\Sigma_{12}, \Sigma_{23}$) can be checked in polynomial time, because the size of the result of SKOLEMIZE is polynomial in the size of its input, and because sufficient conditions can be checked for the termination of $SOCQ^=$ COMPOSE ($\Sigma'_{12}, \Sigma'_{23}$) in polynomial time.

Since DESKOLEMIZE ($\Sigma$) may produce a result of size exponential in the size of $\Sigma$ due to process 816, $CQ^=$ COMPOSE ompose ($\Sigma_{12}, \Sigma_{23}$) may produce a result of size exponential in the size of $\Sigma_{12} \cup \Sigma_{23}$. The following example shows that in the general case this is unavoidable. However, the second part of Proposition 3 shows that we can efficiently check for more restrictive conditions that ensure not only that DESKOLEMIZE succeeds, but also that it terminates in polynomial time.

Theorem 8. For any subexponential function $f$, there are source-to-target CQ-mappings $m_{12}$ and $m_{23}$ given by $(\sigma_1, \sigma_2, \Sigma_{12})$ and $(\sigma_2, \sigma_3, \Sigma_{23})$ such that $m_{13}:=m_{12}\cdot m_{23}$ is a CQ-mapping which is not given by $(\sigma_1, \sigma_3, \Sigma_{13})$ for any $\Sigma_{13}$ whose size is less than $f(s)$ where s is the size of $\Sigma_{12} \cup \Sigma_{23}$.

Proof. (Outline) Pick k large enough so that $f(2kl)<2^k$ where l is the size of the longest constraint below (which 9 is about 18+log k characters long). Such k must exist, since $f$ is subexponential. Set $[k]:=\{1, \ldots, k\}$. Consider the $CQ^=$-mappings $m_{12}$ and $m_{23}$ given by $(\sigma_1, \sigma_2, \Sigma_{12})$ and $(\sigma_2, \sigma_3, \Sigma_{23})$ where $E_{12}$ is $R_0(x) \to \exists y\, S_0(xy)$
$R_i(x) \to S_i(x)$
$\Sigma_{23}$ is $S_0(xy), S_i(x) \to T_i(y)$ for $i \in [k]$, and where $\sigma_1=\{R_i: i\in\{0, \ldots, k\}\}$, $\sigma_2=\{S_i: i\in\{0, \ldots, k\}\}$, and $\sigma_3=\{T_i: i\in[k]\}$. The composition $m_{13}:=m_{12}\cdot m_{13}$ is given by the set $\Sigma_{13}$ of constraints $$R_0(x), R_Z(x) \to \exists y\, T_Z(y)$$

such that $Z \subseteq [k]$, where $R_Z(x):=\char`\^_{i\in Z} R_i(x)$ and similarly for $T_Z$. On the other hand, $m_{13}$ is not given by any $(\sigma_1, \sigma_3, \Sigma)$ where $\Sigma$ has fewer than $2^k-1$ constraints.

Domain, Range, and Other Operators

Composition is one of the operators that take models and/or mappings as inputs and give models and/or mappings as output. Composition can be performed using a combination of other operators, which in turn can be implemented using similar techniques as outlined above. These other operators include:

| | |
|---|---|
| Domain | dom(m) |
| Range | rng(m) |
| Intersection | $A \cap B$ |
| Identity | id(A) |
| Cross product | $A \times B$ |
| Intersection | $m_1 \cap m_2$ |
| Inverse | $m^{-1}$ |

These operators are defined as follows.

$$\text{dom}(m):=\{A: \exists B <A, B> \in m\}.$$

$$\text{rng}(m):=\{B: \exists A <A, B> \in m\}.$$

$$\mathcal{A} \cap \mathcal{B} := \{A: A \in \mathcal{A}, A \in \mathcal{B}\}.$$

$$\text{id}(\mathcal{A}) := \{<A, A>: A \in \mathcal{A}\}.$$

$$\mathcal{A} \times \mathcal{B} := \{<A, B>: A \in \mathcal{A}, B \in \mathcal{B}\}.$$

$$m_1 \cap m_2 := \{<A, B>: <A, B> \in m_1, <A, B> \in m_2\}.$$

$$m^{-1} := \{<B, A>: <A, B> \in m\}.$$

In a relational case, with signatures, a signature is associated to every model and, input and output signatures to every mapping, and the obvious signature-compatibility conditions on these operators are required.

Proposition 4. Every $\mathcal{L} \subseteq CQ_0$ is closed under identity, cross product and intersection.

Proof If $m_{12}$ and $m_{34}$ are given by $(\sigma_1, \sigma_2, \Sigma_{12})$ and $(\sigma_3, \sigma_4, \Sigma_{34})$, and $\mathcal{A}$ and $\mathcal{B}$ are given by $(\sigma_1, \Sigma_1)$ and $(\sigma_2, \Sigma_2)$, then $\mathcal{A} \times \mathcal{B}$ is given by $(\sigma_1, \sigma_2, \Sigma_1, \cup \Sigma_2)$.
$\mathcal{A} \cap \mathcal{B}$ is given by $(\sigma_1, \Sigma_1 \cup \Sigma_2)$ (here $\sigma_1 = \sigma_2$).
$m_{12} \cap m_{34}$ is given by $(\sigma_1, \sigma_2, \Sigma_{12} \cup \Sigma_{34})$ (here $\sigma_1 = \sigma_3$, and $\sigma_2 = \sigma_4$).

To express identity, refer to the third auxiliary signature $\sigma'_2$ (which is normally ignored) which contains, for every relation symbol R in or $\sigma_2$, a relation symbol R of the same arity. In this case, $\sigma_1 = \sigma_2$, so $\sigma_2 = \sigma'_1$.

id($\mathcal{A}$) is given by $(\sigma_1, \sigma_1, \sigma'_1, \Sigma_1 \cup \Sigma)$ where $\Sigma$ consists of two constraints of the form $$\forall(\bar{x})(R\bar{x} \to R\bar{x})$$

$$\forall(\bar{x})(R\bar{x} \to R\bar{x})$$

for every R in $\sigma_1$.

Proposition 5. Each one of the operators, composition, range, and domain can be reduced to any one of the others.
Proof. Suppose
$m_{12}$ is given by $(\sigma_1, \sigma_2, \Sigma_{12})$,
$m_{23}$ is given by $(\sigma_2, \sigma_3, \Sigma_{23})$,
Let
$m_1$ be given by $(\sigma_1 \cup \sigma_3, \sigma_2, \Sigma_{12} \cup \Sigma_{23})$,
$m_2$ be given by $(\sigma_2, \sigma_1 \cup \sigma_3, \Sigma_{12} \cup \Sigma_{23})$,
dom($m_1$) be given $(\sigma_1 \cup \sigma_3, \Sigma_1)$, and
rng($m_2$) be given $(\sigma_1 \cup \sigma_3, \Sigma_2)$,
Then $m_{12}\cdot m_{23}$ is given by $(\sigma_1, \sigma_3, \Sigma_1)$ and by $(\sigma_1, \sigma_3, \Sigma_2)$.
This proves the composition can be expressed by either domain or range.

Conversely, suppose $m_{12}$ is given by $(\sigma_1, \sigma_2, \Sigma_{12})$.

Let $m_{21}$ be given by $(\sigma_2, \sigma_1, \emptyset)$, $m_{12} \cdot m_{21}$ be given by $(\sigma_1, \sigma_1, \Sigma_1)$, and $m_{21} \cdot m_{12}$ be given by $(\sigma_2, \sigma_2, \Sigma_2)$.

Then $\text{dom}(m_{12})$ and $\text{rng}(m_{12})$ are given respectively by $(\sigma_1, \Sigma_1)$ and $(\sigma_2, \Sigma_2)$.

This proves that domain and range can be expressed by composition.

All the languages considered satisfy the premises of Proposition 4. Therefore, Proposition 5 indicates that attention can be focused on closure under composition and inverse. Notice that if an $\mathcal{L}$-mapping m is given by $(\sigma_1, \sigma_2, \Sigma_{12})$, then its inverse is given by $(\sigma_2, \sigma_1, \Sigma_{12})$. However, the restrictions on $\mathcal{L}$ may be such that the second expression no longer gives an $\mathcal{L}$-mapping. For example, this happens with "source-to-target" expressions. In contrast, $CQ_0^=$, $CQ^=$, and $SOCQ^=$ mappings are closed under inverse, so it is sufficient to study composition.

Proposition 5 implies that any algorithmic procedure that can be used to implement domain and range can be deployed for implementing composition. This can be achieved either directly, by invoking the algorithms presented supra, or indirectly, by first executing the operators domain and range, and then using their results to obtain the composition.

Computing Environments

Figure 9:
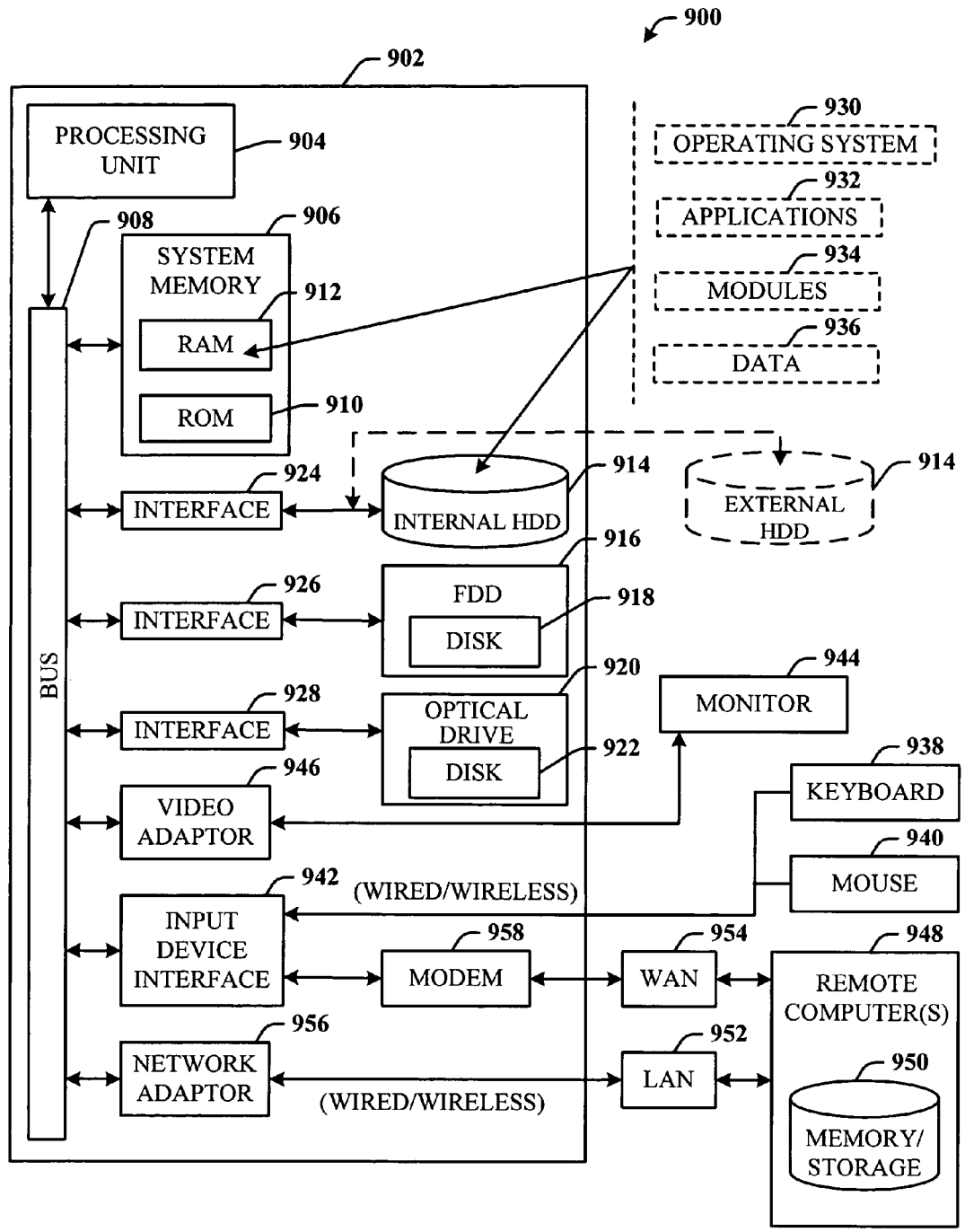
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, or any other medium which can be used to store the desired information and which can be accessed by the computer.

Communication media typically embodies computer-readable instructions, data structures, program modules, and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
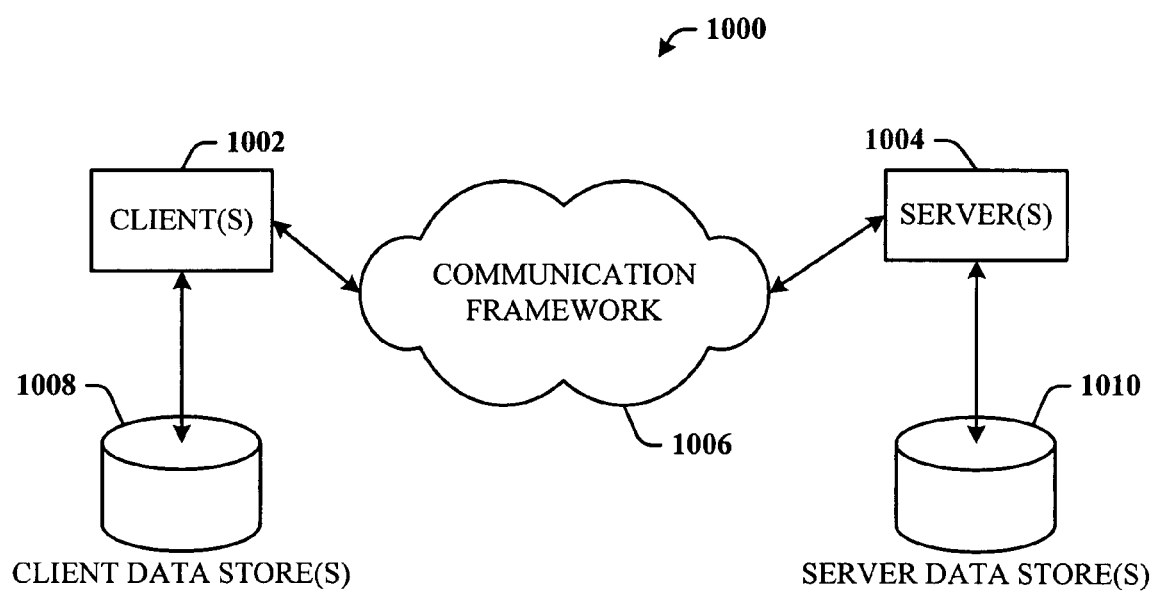
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system that facilitates data mapping, comprising:
a processor that executes the following computer executable components stored on a computer readable medium:
a composition component that composes input schema mappings using a deductive procedure to obtain a finite axiomatization of all constraints that appear in the composition mapping and outputs a resulting schema mapping derived from the input schema mappings and that specifies a same set of constraints given by the input schema mappings to support data transformation and exchange for data warehousing, where data is received from many different sources for storage and access, and where the different sources are defined as a wired or a wireless network;
wherein the deductive procedure is concurrently performed on all constraints present in the input schema mappings when composing a sequence of three or more mappings, and wherein one or both of the input schema mappings are not functions, such as constraints between two schemas and the inverse of functions;
wherein the axiomatization includes a finite second-order axiomatization that is de-Skolemized to obtain a schema mapping expressed by first-order constraints; and the de-Skolemized finite second-order axiomatization comprises unnested second-order dependencies;
wherein the input schema mappings expressed by embedded dependencies are Skolemized to obtain intermediate schema mappings expressed by second-order dependencies and a finite axiomatization is computed of all constraints over input and output signatures which are deduced from constraints that give the intermediate schema mappings; and
wherein a check is performed to determine if a constraint of a form $\phi(z), R(y) \rightarrow R(x)$ appears in the finite axiomatization, such that,
$\phi(z)$ is a conjunction of atoms over $S_1 \cup S_3$;
there is no atom $R(w)$ in $\phi(z)$ with $\{x\} \subseteq \{w\}$;
$\{x\}$ is not a subset of $\{y\}$; and
R is a relation symbol in the schema $S_2$.

2. The system of claim 1, wherein the deductive procedure is a complete deductive procedure that includes resolution.

3. The system of claim 1, wherein the deductive procedure is checked for termination and yielding of a correct result.

4. The system of claim 1, wherein the input schema mappings are expressed by embedded dependencies and Skolemized to obtain schema mappings expressed by a second-order dependencies.

5. The system of claim 1, wherein the deductive procedure computes at least one of an operator domain and an operator range using such that the input schema mappings are composed using the first procedure.

6. A computer readable medium having stored thereon the component of claim 1.

7. The system of claim 1, wherein the schema mappings are expressed by at least one of full, embedded, and second-order dependencies, which the second-order dependencies need not be in source-to-target form.

8. A method of mapping data, comprising:
employing a processor to execute computer executable instructions stored on a computer readable medium to perform the following acts:
composing input schema mappings with a composition component by using a deductive procedure to obtain a finite axiomatization of all constraints that appear in the composition mapping to support data transformation and exchange for data warehousing, where data is received from many different sources for storage and access, and where the different sources are defined as a wired or a wireless network;
concurrently performing the deductive procedure on all constraints present in the input schema mappings when composing a sequence of three or more mappings, wherein one or both of the input schema mappings are not functions, such as constraints between two schemas and the inverse of functions;
de-Skolemizing a finite second-order axiomatization to obtain a schema mapping expressed by first-order constraints and unnesting second-order dependencies;
Skolemizing input schema mappings expressed by embedded dependencies to obtain intermediate schema mappings expressed by second-order dependencies;
computing a finite axiomatization of all constraints over input and output signatures which are deduced from constraints that give the intermediate schema mappings;
outputting a resulting schema mapping derived from the input schema mappings to support data transformation and exchange; and
performing a check to determine if a constraint of a form $\phi(z), R(y) \rightarrow R(x)$ appears in the finite axiomatization, such that,
$\phi(z)$ is a conjunction of atoms over $S_1 \cup S_3$;
there is no atom $R(w)$ in $\phi(z)$ with $\{x\} \subseteq \{w\}$;
$\{x\}$ is not a subset of $\{y\}$; and
R is a relation symbol in the schema $S_2$.

9. The method of claim 8, wherein the act of de-Skolemizing the finite axiomatization further comprises renaming variables in constraints such that all terms containing a same function symbol are unified.

10. The method of claim 9, further comprising renaming the variables by considering all pairs of constraints, which can be done in polynomial time.

11. The method of claim 8, wherein the act of de-Skolemizing the finite axiomatization further comprises an act of eliminating atoms that contain variables bound to Skolem terms.

12. The method of claim 8, further comprising the acts of:
Skolemizing the input schema mappings expressed by embedded dependencies to obtain intermediate schema mappings expressed by second-order dependencies;
computing a finite axiomatization of all constraints over input and output signatures which can be deduced from constraints that give the intermediate schema mappings; and
de-Skolemizing the finite axiomatization to obtain a schema mapping expressed by embedded dependencies.

13. A system that facilitates data mapping, comprising:
a processor coupled to a memory, the processor executing:
means for composing input schema mappings with a composition component by using a deductive procedure to obtain a finite axiomatization of all constraints that appear in the composition mapping to support data transformation and exchange for data warehousing, where data is received from many different sources for storage and access, and where the different sources are defined as a wired or a wireless network;
means for concurrently performing the deductive procedure on all constraints present in the input schema mappings when composing a sequence of three or more mappings, wherein one or both of the input schema mappings are not functions, such as constraints between two schemas and the inverse of functions;

means for Skolemizing the input schema mappings expressed by embedded dependencies to obtain schema mappings expressed by a second-order dependencies;

means for de-Skolemizing a finite second-order axiomatization to obtain a schema mapping expressed by first-order constraints and unnesting second-order dependencies;

means for Skolemizing input schema mappings expressed by embedded dependencies to obtain intermediate schema mappings expressed by second-order dependencies;

means for computing a finite axiomatization of all constraints over input and output signatures which are deduced from constraints that give the intermediate schema mappings;

means for outputting a resulting schema mapping derived from the input schema mappings to support data transformation and exchange; and means for performing a check to determine if a constraint of a form $\phi(z), R(y) \rightarrow R(x)$ appears in the finite axiomatization, such that, $\phi(z)$ is a conjunction of atoms over $S_1 \cup S_3$;

there is no atom $R(w)$ in $\phi(z)$ with $\{x\} \subseteq \{w\}$;

$\{x\}$ is not a subset of $\{y\}$; and

R is a relation symbol in the schema $S_2$.

* * * * *